United States Patent
Bassett

(10) Patent No.: US 8,327,780 B2
(45) Date of Patent: Dec. 11, 2012

(54) AGRICULTURAL IMPLEMENT HAVING FLUID DELIVERY FEATURES

(75) Inventor: Joseph D. Bassett, DeKalb, IL (US)

(73) Assignee: Dawn Equipment Company, Sycamore, IL (US)

(*) Notice: Subject to any disclaimer, the term of this patent is extended or adjusted under 35 U.S.C. 154(b) by 324 days.

(21) Appl. No.: 12/728,734

(22) Filed: Mar. 22, 2010

(65) Prior Publication Data

US 2011/0088603 A1    Apr. 21, 2011

Related U.S. Application Data

(60) Provisional application No. 61/252,482, filed on Oct. 16, 2009.

(51) Int. Cl.
| | |
|---|---|
| A01B 49/04 | (2006.01) |
| A01C 5/00 | (2006.01) |
| A01C 9/00 | (2006.01) |
| A01C 13/00 | (2006.01) |
| A01C 23/00 | (2006.01) |

(52) U.S. Cl. ........ 111/119; 111/121; 111/140; 111/167; 111/193; 111/195; 111/900

(58) Field of Classification Search ............ 111/121, 111/118, 199, 139, 140, 149, 157, 163–165, 111/167, 170, 174, 190–195, 200, 900
See application file for complete search history.

(56) References Cited

U.S. PATENT DOCUMENTS

| | | | |
|---|---|---|---|
| 353,491 A | 2/1886 | Wells | |
| 803,088 A | 10/1905 | Barker | |
| 1,134,462 A | 4/1915 | Kendrick | |
| 1,158,023 A | 10/1915 | Beaver | |
| 1,247,744 A | 11/1917 | Trimble | |
| 1,260,752 A | 3/1918 | Casaday | |
| 1,321,040 A | 11/1919 | Hoffman | |
| 1,391,593 A | 9/1921 | Sweeting | |
| 1,398,668 A | 11/1921 | Bordsen | |

(Continued)

FOREIGN PATENT DOCUMENTS

BE    551372    10/1956

(Continued)

OTHER PUBLICATIONS

Case Corporation Brochure, Planters 900 Series Units/Modules Product Information, Aug. 1986 (4 pages).

(Continued)

Primary Examiner — Christopher J. Novosad
(74) Attorney, Agent, or Firm — Nixon Peabody LLP

(57) ABSTRACT

An agricultural implement is directed to delivering a fluid to the soil of an agricultural field and includes a main frame attached to an opener device, a closing device, a pivoting assembly, and an injection tine. The opener device forms a furrow in the soil, the closing device trails the opener device for closing the furrow, and the injection tine delivers the fluid towards the furrow. The injection tine has a pivoting end attached to the pivoting assembly and a bottom end extending downwardly into the furrow between the opener device and the closing device. The pivoting end is pivotably connected at the pivoting end such that the injection tine is freely pivotable in at least two independent pivotable directions relative to furrow. A diffuser is attached to the bottom end of the injection tine for expelling the fluid into the furrow.

20 Claims, 14 Drawing Sheets

U.S. PATENT DOCUMENTS

| | | | |
|---|---|---|---|
| 1,481,981 A | 1/1924 | Boye | |
| 1,791,462 A | 2/1931 | Bermel | |
| 1,901,299 A | 3/1933 | Johnson | |
| 1,901,778 A | 3/1933 | Schlag | |
| 2,014,334 A | 9/1935 | Johnson | |
| 2,058,539 A | 10/1936 | Welty et al. | |
| 2,269,051 A | 1/1942 | Cahoy | |
| 2,505,276 A | 4/1950 | Boroski | |
| 2,561,763 A | 7/1951 | Waters et al. | |
| 2,593,176 A | 4/1952 | Patterson | |
| 2,611,306 A | 9/1952 | Strehlow et al. | |
| 2,612,827 A * | 10/1952 | Baggette et al. | 172/271 |
| 2,691,353 A | 10/1954 | Secondo | |
| 2,692,544 A | 10/1954 | Jessup | |
| 2,715,286 A | 8/1955 | Saveson | |
| 2,754,622 A | 7/1956 | Rohnert | |
| 2,771,044 A | 11/1956 | Putifer | |
| 2,773,343 A | 12/1956 | Oppel | |
| 2,777,373 A | 1/1957 | Pursche | |
| 2,799,234 A | 7/1957 | Chancey | |
| 2,805,574 A | 9/1957 | Jackson, Jr. et al. | |
| 2,925,872 A | 2/1960 | Darnell | |
| 2,960,358 A | 11/1960 | Christison | |
| 3,010,744 A | 11/1961 | Hollis | |
| 3,014,547 A | 12/1961 | Van der Lely | |
| 3,038,424 A | 6/1962 | Johnson | |
| 3,042,121 A | 7/1962 | Broetzman et al. | |
| 3,057,092 A | 10/1962 | Curlett | |
| 3,058,243 A | 10/1962 | McGee | |
| 3,065,879 A | 11/1962 | Jennings et al. | |
| 3,110,973 A | 11/1963 | Reynolds | |
| 3,123,152 A | 3/1964 | Biskis | |
| 3,188,989 A | 6/1965 | Johnston | |
| 3,213,514 A | 10/1965 | Evans | |
| 3,250,109 A | 5/1966 | Spyridakis | |
| 3,314,278 A | 4/1967 | Bergman | |
| 3,319,589 A * | 5/1967 | Moran | 111/121 |
| 3,351,139 A | 11/1967 | Schmitz et al. | |
| 3,355,930 A | 12/1967 | Fedorov | |
| 3,370,450 A | 2/1968 | Scheucher | |
| 3,420,273 A | 1/1969 | Greer | |
| 3,447,495 A | 6/1969 | Miller et al. | |
| 3,539,020 A | 11/1970 | Andersson et al. | 74/527 |
| 3,543,603 A | 12/1970 | Gley | 74/529 |
| 3,561,541 A | 2/1971 | Woelfel | 172/265 |
| 3,576,098 A | 4/1971 | Brewer | 56/295 |
| 3,581,685 A | 6/1971 | Taylor | 111/7 |
| 3,593,720 A | 7/1971 | Botterill et al. | 130/27 |
| 3,606,745 A | 9/1971 | Girodat | 56/20 |
| 3,635,495 A | 1/1972 | Orendorff | 280/415 |
| 3,653,446 A | 4/1972 | Kalmon | 172/4 |
| 3,701,327 A | 10/1972 | Krumholz | 111/81 |
| 3,711,974 A | 1/1973 | Webb | 40/63 |
| 3,718,191 A | 2/1973 | Williams | 172/196 |
| 3,749,035 A | 7/1973 | Cayton et al. | 111/85 |
| 3,753,341 A | 8/1973 | Berg, Jr. et al. | 56/400.04 |
| 3,766,988 A | 10/1973 | Whitesides | 172/548 |
| 3,774,446 A | 11/1973 | Diehl | 73/194 |
| 3,906,814 A | 9/1975 | Magnussen | 74/483 PB |
| 3,939,846 A | 2/1976 | Drozhzhin et al. | 130/27 |
| 3,945,532 A | 3/1976 | Marks | 222/55 |
| 3,975,890 A | 8/1976 | Rodger | 56/208 |
| 4,018,101 A | 4/1977 | Mihalic | 74/493 |
| 4,044,697 A | 8/1977 | Swanson | 111/66 |
| 4,055,126 A | 10/1977 | Brown et al. | 111/85 |
| 4,058,171 A | 11/1977 | van der Lely | 172/713 |
| 4,063,597 A | 12/1977 | Day | 172/126 |
| 4,096,730 A | 6/1978 | Martin | 72/352 |
| 4,099,576 A | 7/1978 | Jilani | 172/555 |
| 4,122,715 A | 10/1978 | Yokoyama et al. | 73/228 |
| 4,129,082 A | 12/1978 | Betulius | 111/7 |
| 4,141,200 A | 2/1979 | Johnson | 56/10.2 |
| 4,141,676 A | 2/1979 | Jannen et al. | 417/539 |
| 4,142,589 A | 3/1979 | Schlagenhauf | 172/510 |
| 4,147,305 A | 4/1979 | Hunt | 239/167 |
| 4,149,475 A | 4/1979 | Bailey et al. | 111/66 |
| 4,157,661 A | 6/1979 | Schindel | 73/228 |
| 4,161,090 A | 7/1979 | Watts, Jr. | 52/301 |
| 4,173,259 A | 11/1979 | Heckenkamp | 172/10 |
| 4,182,099 A | 1/1980 | Davis et al. | 56/16.4 |
| 4,187,916 A | 2/1980 | Harden et al. | 172/146 |
| 4,191,262 A | 3/1980 | Sylvester | 172/459 |
| 4,196,567 A | 4/1980 | Davis et al. | 56/13.7 |
| 4,196,917 A | 4/1980 | Oakes et al. | 280/463 |
| 4,206,817 A | 6/1980 | Bowerman | 172/559 |
| 4,213,408 A | 7/1980 | West et al. | 111/85 |
| 4,225,191 A | 9/1980 | Knoski | 301/9 |
| 4,233,803 A | 11/1980 | Davis et al. | 56/14.9 |
| 4,241,674 A | 12/1980 | Mellinger | 111/52 |
| 4,280,419 A | 7/1981 | Fischer | 111/80 |
| 4,295,532 A | 10/1981 | Williams et al. | 172/184 |
| 4,301,870 A | 11/1981 | Carre et al. | 172/7 |
| 4,307,674 A | 12/1981 | Jennings et al. | 111/85 |
| 4,317,355 A | 3/1982 | Hatsuno et al. | 72/342 |
| 4,359,101 A | 11/1982 | Gagnon | 172/38 |
| 4,375,837 A | 3/1983 | van der Lely et al. | 172/68 |
| 4,377,979 A | 3/1983 | Peterson et al. | 111/52 |
| 4,407,371 A | 10/1983 | Hohl | 172/253 |
| 4,433,568 A | 2/1984 | Kondo | 72/356 |
| 4,438,710 A | 3/1984 | Paladino | 111/3 |
| 4,445,445 A | 5/1984 | Sterrett | 111/7 |
| 4,461,355 A | 7/1984 | Peterson et al. | 172/156 |
| 4,481,830 A | 11/1984 | Smith et al. | 73/861.71 |
| 4,499,775 A | 2/1985 | Lasoen | 73/862.57 |
| 4,506,610 A | 3/1985 | Neal | 111/87 |
| 4,508,178 A | 4/1985 | Cowell et al. | 172/239 |
| 4,528,920 A | 7/1985 | Neumeyer | 111/85 |
| 4,530,405 A | 7/1985 | White | 172/126 |
| 4,537,262 A | 8/1985 | van der Lely | 172/146 |
| 4,538,688 A | 9/1985 | Szucs et al. | 172/555 |
| 4,550,122 A | 10/1985 | David et al. | 172/158 |
| 4,553,607 A | 11/1985 | Behn et al. | 172/156 |
| 4,580,506 A | 4/1986 | Fleischer et al. | 111/7 |
| 4,596,200 A | 6/1986 | Gafford et al. | 111/85 |
| 4,603,746 A | 8/1986 | Swales | 172/559 |
| 4,604,906 A | 8/1986 | Scarpa | 73/861.74 |
| 4,630,773 A | 12/1986 | Ortlip | 239/1 |
| 4,643,043 A | 2/1987 | Furuta et al. | 74/503 |
| 4,650,005 A | 3/1987 | Tebben | 172/430 |
| 4,669,550 A | 6/1987 | Sittre | 172/559 |
| 4,671,193 A | 6/1987 | States | 111/73 |
| 4,674,578 A | 6/1987 | Bexten et al. | 172/126 |
| 4,703,809 A | 11/1987 | Van den Ende | 172/147 |
| 4,726,304 A | 2/1988 | Dreyer et al. | 111/73 |
| 4,744,316 A | 5/1988 | Lienemann et al. | 111/69 |
| 4,762,075 A | 8/1988 | Halford | 111/73 |
| 4,765,190 A | 8/1988 | Strubbe | 73/861.72 |
| 4,768,387 A | 9/1988 | Kemp et al. | 73/861.73 |
| 4,779,684 A | 10/1988 | Schultz | 171/62 |
| 4,785,890 A | 11/1988 | Martin | 172/29 |
| 4,825,957 A | 5/1989 | White et al. | 172/126 |
| 4,825,959 A | 5/1989 | Wilhelm | 172/720 |
| 4,926,767 A | 5/1990 | Thomas | 111/187 |
| 4,930,431 A | 6/1990 | Alexander | 111/164 |
| 4,986,367 A | 1/1991 | Kinzenbaw | 172/126 |
| 4,998,488 A | 3/1991 | Hansson | 111/187 |
| 5,015,997 A | 5/1991 | Strubbe | 340/684 |
| 5,027,525 A | 7/1991 | Haukaas | 33/624 |
| 5,033,397 A | 7/1991 | Colburn, Jr. | 111/118 |
| 5,065,632 A | 11/1991 | Reuter | 73/861.73 |
| 5,074,227 A | 12/1991 | Schwitters | |
| 5,076,180 A | 12/1991 | Schneider | 111/139 |
| 5,092,255 A | 3/1992 | Long et al. | 111/167 |
| 5,113,957 A | 5/1992 | Tamai et al. | 172/10 |
| 5,129,282 A | 7/1992 | Bassett et al. | 74/529 |
| 5,234,060 A | 8/1993 | Carter | 172/413 |
| 5,240,080 A | 8/1993 | Bassett et al. | 172/740 |
| 5,255,617 A | 10/1993 | Williams et al. | 111/140 |
| 5,269,237 A | 12/1993 | Baker et al. | 111/121 |
| 5,282,389 A | 2/1994 | Faivre et al. | 73/861.73 |
| 5,285,854 A | 2/1994 | Thacker et al. | 172/176 |
| 5,337,832 A | 8/1994 | Bassett | 172/504 |
| 5,341,754 A | 8/1994 | Winterton | 111/139 |
| 5,346,019 A | 9/1994 | Kinzenbaw et al. | 172/311 |
| 5,346,020 A | 9/1994 | Bassett | 172/540 |
| 5,349,911 A | 9/1994 | Holst et al. | 111/139 |
| 5,351,635 A * | 10/1994 | Hulicsko | 111/135 |

| | | | |
|---|---|---|---|
| 5,379,847 A | 1/1995 | Snyder | 172/128 |
| 5,394,946 A | 3/1995 | Clifton et al. | 172/139 |
| 5,398,771 A | 3/1995 | Hornung et al. | 172/311 |
| 5,443,023 A | 8/1995 | Carroll | 111/191 |
| 5,443,125 A | 8/1995 | Clark et al. | 172/608 |
| 5,461,995 A | 10/1995 | Winterton | 111/139 |
| 5,462,124 A | 10/1995 | Rawson | 172/569 |
| 5,473,999 A | 12/1995 | Rawson et al. | 111/127 |
| 5,477,792 A | 12/1995 | Bassett et al. | 111/121 |
| 5,479,868 A | 1/1996 | Bassett | 111/139 |
| 5,479,992 A | 1/1996 | Bassett | 172/4 |
| 5,485,796 A | 1/1996 | Bassett | 111/33 |
| 5,485,886 A | 1/1996 | Bassett | 172/763 |
| 5,497,717 A | 3/1996 | Martin | 111/191 |
| 5,497,837 A | 3/1996 | Kehrney | 172/619 |
| 5,499,683 A | 3/1996 | Bassett | 172/4 |
| 5,499,685 A | 3/1996 | Downing, Jr. | 172/699 |
| 5,517,932 A | 5/1996 | Ott et al. | 111/193 |
| 5,531,171 A * | 7/1996 | Whitesel et al. | 111/121 |
| 5,542,362 A | 8/1996 | Bassett | 111/120 |
| 5,562,165 A | 10/1996 | Janelle et al. | 172/4 |
| 5,590,611 A * | 1/1997 | Smith | 111/127 |
| 5,603,269 A | 2/1997 | Bassett | 111/52 |
| 5,623,997 A | 4/1997 | Rawson et al. | 172/156 |
| 5,640,914 A | 6/1997 | Rawson | 111/139 |
| 5,657,707 A | 8/1997 | Dresher et al. | 111/139 |
| 5,660,126 A | 8/1997 | Freed et al. | 111/140 |
| 5,685,245 A | 11/1997 | Bassett | 111/62 |
| 5,704,430 A | 1/1998 | Smith et al. | 172/29 |
| 5,709,271 A | 1/1998 | Bassett | 172/4 |
| 5,727,638 A | 3/1998 | Wodrich et al. | 172/414 |
| 5,852,982 A | 12/1998 | Peter | 111/118 |
| 5,868,207 A | 2/1999 | Langbakk et al. | 172/274 |
| 5,878,678 A | 3/1999 | Stephens et al. | 111/139 |
| RE36,243 E | 7/1999 | Rawson et al. | 111/121 |
| 5,970,891 A | 10/1999 | Schlagel | 111/135 |
| 5,970,892 A | 10/1999 | Wendling et al. | 111/139 |
| 5,988,293 A | 11/1999 | Brueggen et al. | 172/414 |
| 6,067,918 A | 5/2000 | Kirby | 111/121 |
| 6,164,385 A | 12/2000 | Buchl | 172/239 |
| 6,223,663 B1 | 5/2001 | Wendling et al. | 111/139 |
| 6,223,828 B1 | 5/2001 | Paulson et al. | 171/63 |
| 6,253,692 B1 | 7/2001 | Wendling et al. | 111/139 |
| 6,314,897 B1 | 11/2001 | Hagny | 111/192 |
| 6,325,156 B1 | 12/2001 | Barry | 172/518 |
| 6,330,922 B1 | 12/2001 | King | 172/166 |
| 6,331,142 B1 | 12/2001 | Bischoff | 460/112 |
| 6,343,661 B1 | 2/2002 | Thompson et al. | 172/444 |
| 6,382,326 B1 | 5/2002 | Goins et al. | 172/239 |
| 6,389,999 B1 | 5/2002 | Duello | 111/200 |
| 6,453,832 B1 | 9/2002 | Schaffert | 111/150 |
| 6,460,623 B1 | 10/2002 | Knussman et al. | 172/4 |
| 6,516,595 B2 | 2/2003 | Rhody et al. | 56/10.2 E |
| 6,575,104 B2 | 6/2003 | Brummelhuis | 111/139 |
| 6,644,224 B1 | 11/2003 | Bassett | 111/157 |
| 6,701,857 B1 | 3/2004 | Jensen et al. | 111/200 |
| 6,786,130 B2 | 9/2004 | Steinlage et al. | 91/390 |
| 6,834,598 B2 | 12/2004 | Jüptner | 111/140 |
| 6,840,853 B2 | 1/2005 | Foth | 460/111 |
| 6,889,943 B2 | 5/2005 | Dinh et al. | 248/34 |
| 6,912,963 B2 | 7/2005 | Bassett | 111/163 |
| 6,986,313 B2 | 1/2006 | Halford et al. | 111/186 |
| 6,997,400 B1 | 2/2006 | Hanna et al. | 239/383 |
| 7,004,090 B2 | 2/2006 | Swanson | 111/119 |
| 7,044,070 B2 | 5/2006 | Kaster et al. | 111/62 |
| 7,063,167 B1 | 6/2006 | Staszak et al. | 172/328 |
| 7,222,575 B2 | 5/2007 | Bassett | 111/140 |
| 7,290,491 B2 | 11/2007 | Summach et al. | 111/181 |
| 7,360,494 B2 | 4/2008 | Martin | 111/164 |
| 7,360,495 B1 | 4/2008 | Martin | 111/164 |
| 7,438,006 B2 | 10/2008 | Mariman et al. | 111/164 |
| 7,451,712 B2 | 11/2008 | Bassett et al. | 111/140 |
| 7,523,709 B1 | 4/2009 | Kiest | 111/119 |
| 7,665,539 B2 | 2/2010 | Bassett et al. | 172/540 |
| 7,673,570 B1 | 3/2010 | Bassett | 111/63 |
| 7,743,718 B2 | 6/2010 | Bassett | 111/135 |
| 7,870,827 B2 | 1/2011 | Bassett | 111/119 |
| 2006/0102058 A1 | 5/2006 | Swanson | 111/119 |
| 2006/0191695 A1 | 8/2006 | Walker et al. | 172/452 |
| 2006/0237203 A1 | 10/2006 | Miskin | 172/799.5 |
| 2007/0044694 A1 | 3/2007 | Martin | 111/121 |
| 2008/0093093 A1 | 4/2008 | Sheppard et al. | 172/2 |
| 2010/0108336 A1 | 5/2010 | Thomson et al. | 172/795 |
| 2010/0154693 A1 | 6/2010 | Bassett | 111/123 |
| 2010/0198529 A1 | 8/2010 | Sauder et al. | 702/41 |
| 2010/0300710 A1 | 12/2010 | Bassett | 172/1 |
| 2011/0036602 A1 | 2/2011 | Bassett | 172/1 |
| 2012/0060730 A1 | 3/2012 | Bassett | 111/149 |
| 2012/0060731 A1 | 3/2012 | Bassett | 111/149 |

FOREIGN PATENT DOCUMENTS

| | | |
|---|---|---|
| CA | 530673 | 9/1956 |
| DE | 335464 | 9/1921 |
| DE | 1108971 | 6/1961 |
| DE | 24 02 411 | 7/1975 |
| GB | 1 574 412 | 9/1980 |
| GB | 2 056 238 A | 10/1982 |
| JP | 54-57726 | 5/1979 |
| SU | 392897 | 8/1973 |
| SU | 436778 | 7/1974 |
| SU | 611201 | 6/1978 |
| SU | 625648 | 9/1978 |
| SU | 1410884 A1 | 7/1988 |
| SU | 1466674 | 3/1989 |

OTHER PUBLICATIONS

Buffalo Farm Equipment All Flex Cultivator Operator Manual, Apr. 1990 (7 pages).

Shivvers, Moisture Trac 3000 Brochure, Aug. 21, 1990 (5 pages).

The New Farm, "*New Efficiencies in Nitrogen Application,*" Feb. 1991, p. 6 (1 page).

Hiniker Company, Flow & Acreage Continuous Tracking System Monitor Demonstration Manuel, date estimated as early as Feb. 1991 (7 pages).

Russnogle, John, "*Sky Spy: Gulf War Technology Pinpoints Field and Yields,*" Top Producer, A Farm Journal Publication, Nov. 1991, pp. 12-14 (4 pages).

Borgelt, Steven C., "*Sensor Technologies and Control Strategies for Managing Variability,*" University of Missouri, Apr. 14-16, 1992 (15 pages).

Buffalo Farm Equipment Catalog on Models 4600, 4630, 4640, and 4620, date estimated as early as Feb. 1992 (4 pages).

Hiniker 5000 Cultivator Brochure, date estimated as early as Feb. 1992 (4 pages).

Hiniker Series 5000 Row Cultivator Rigid and Folding Toolbar Operator's Manual, date estimated as early as Feb. 1992 (5 pages).

Orthman Manufacturing, Inc., Rowcrop Cultivator Booklet, date estimated as early as Feb. 1992 (4 pages).

Yetter Catalog, date estimated as early as Feb. 1992 (4 pages).

Finck, Charlene, "*Listen to Your Soil,*" Farm Journal Article, Jan. 1993, pp. 14-15 (2 pages).

Acu-Grain, "*Combine Yield Monitor 99% Accurate? 'You Bet Your Bushels!!'*" date estimated as early as Feb. 1993 (2 pages).

John Deere, New 4435 Hydro Row-Crop and Small-Grain Combine, date estimated as early as Feb. 1993 (8 pages).

Vansichen, R. et al., "*Continuous Wheat Yield Measurement on a Combine,*" date estimated as early as Feb. 1993 (5 pages).

Martin Industries, LLC Paired 13" Spading Closing Wheels Brochure, date estimated as early as Jun. 6, 2012, pp. 18-25 (8 pages).

\* cited by examiner

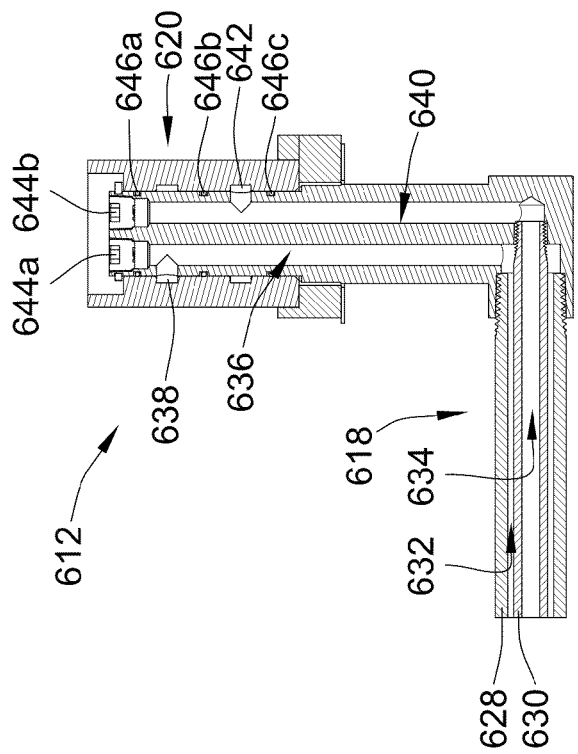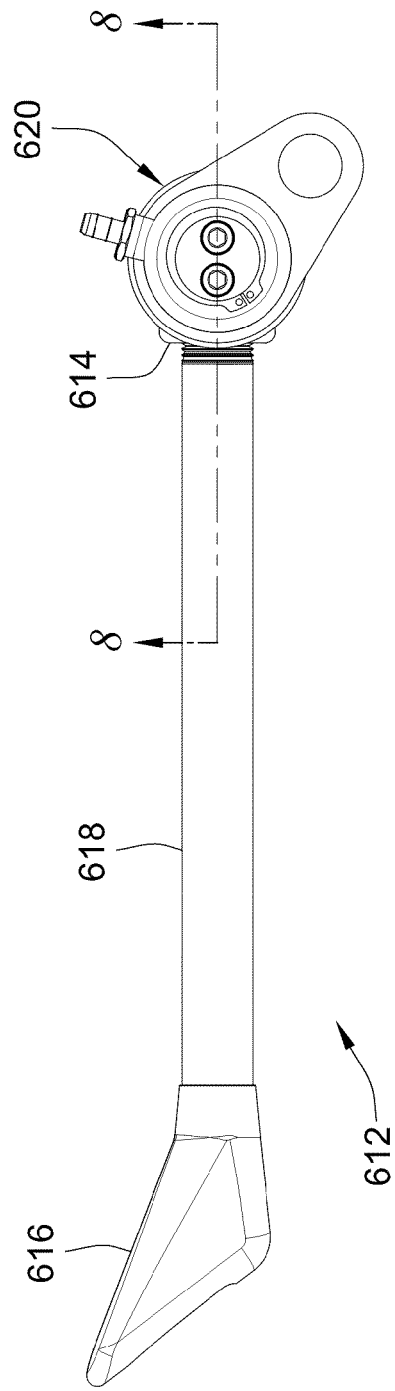

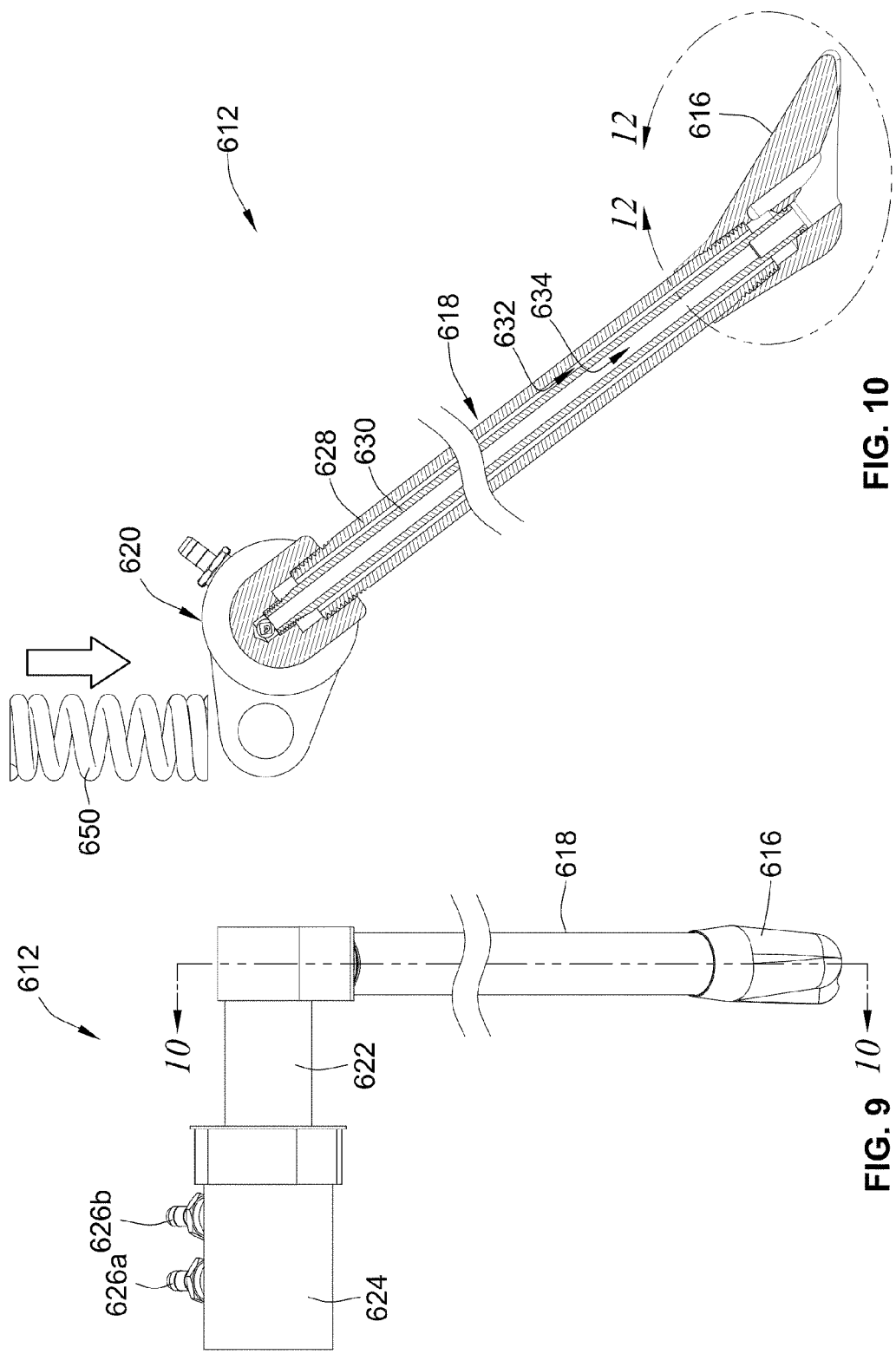

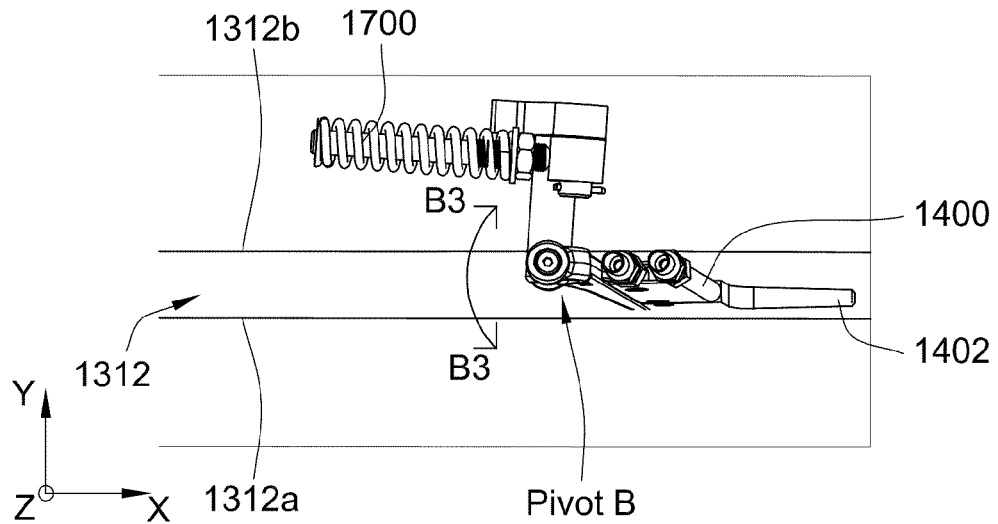
FIG. 19A
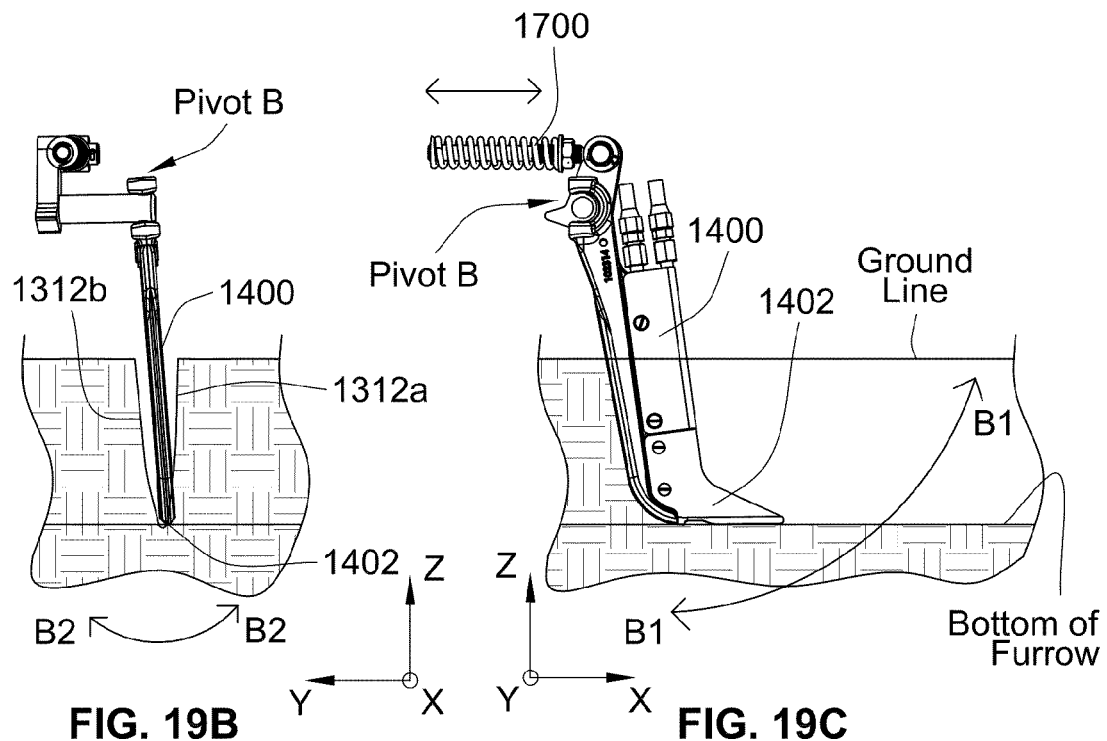
FIG. 19B  FIG. 19C

US 8,327,780 B2

AGRICULTURAL IMPLEMENT HAVING FLUID DELIVERY FEATURES

RELATED APPLICATIONS

This application is related to and claims priority to U.S. Provisional Patent Application Ser. No. 61/252,482, filed Oct. 16, 2009, and titled "Agricultural Implement Having Fertilizer Delivery Features, which is incorporated herein in its entirety.

FIELD OF THE INVENTION

The present invention relates generally to agricultural equipment and, more particularly, to an implement having an assembly for efficient delivery of a fluid to a furrow.

BACKGROUND OF THE INVENTION

One of the common forms of fertilizer used in agricultural fields is ammonia gas, which functions as a nitrogen fertilizer when delivered into the soil. Although ammonia gas has been used as an agricultural fertilizer for many years, problems remain in achieving efficient and effective delivery of ammonia gas into soil before vapor escapes to the atmosphere and is chemically attached into the soil. Problems are also caused by the cooling effect caused by expansion of the ammonia gas as it is discharged onto the soil, which causes freezing of soil and moisture on the implement, leading to adverse effects on performance.

Similar problems are present in delivery of other types of products, such as liquid nitrogen, water, etc. For example, mixing of chemicals prior to injection into the furrow results in inefficient delivery of the chemicals to the soil. Specifically, the inefficient delivery causes loss of quantities of the reacting chemicals.

Typical agricultural implements for delivering fertilizer or other chemical products to an agricultural soil fail to achieve efficient delivery of the respective products. One problem of present agricultural implements is directed to fertilizer coulter assemblies that fail to achieve different size fertilizer openings or different levels of soil and residue disturbance. Typically, only a single size can be achieved for a fertilizer opening and a single level can be achieved for soil and residue disturbance. However, present agricultural implements fail to create an adjustable cavity size to accommodate different volumes of products and/or different types of products (e.g., manure vs. ammonia) that can be deposited into the soil.

Another problem of present agricultural implements is directed to closer assemblies that have adjustable spring loaded down pressure. These types of closer assemblies often bounce at high speed, causing inconsistent slot closure and fertilizers sealing. In turn, this results in significant fertilizer losses through volatilization.

Yet another problem of present agricultural implements is directed to a fertilizer application tine, tube, or knife that fails to adequately locate the bottom of the furrow. This type of problem affects the performance of the agricultural implement.

What is needed, therefore, is an agricultural implement for delivering a fluid to an agricultural soil that addresses the above-stated and other problems.

SUMMARY OF THE INVENTION

In accordance with one embodiment, an agricultural implement is directed to delivering an agricultural media that may include a mixture of fluids, gases, and/or solids to the soil of an agricultural field and includes a main frame attached to an opener device, a closing device, a pivoting assembly, and an injection tine. The opener device forms a furrow in the soil, the closing device trails the opener device for closing the furrow, and the injection tine delivers a fluid towards the furrow. The injection tine has a pivoting end attached to the pivoting assembly and a bottom end extending downwardly into the furrow between the opener device and the closing device. The pivoting end is pivotably connected at the pivoting end such that the injection tine is freely pivotable in at least two independent pivotable directions relative to furrow. A diffuser is attached to the bottom end of the injection tine for expelling the fluid into the furrow.

In accordance with another embodiment, a method of delivering a fluid to the soil of an agricultural field includes forming a furrow in the soil with a towed opener device and closing the furrow with a towed closing device trailing the opener device. An injection tine extends downwardly into the furrow between the opener device and the closing device, wherein the injection tine has a bottom end coupled to a diffuser. While the injection tine is moving within the furrow, the injection tine freely moves in at least three independent pivotable directions to self-adjust between opposite walls of the furrow. The fluid is expelled through the diffuser after the closing of the furrow.

BRIEF DESCRIPTION OF THE DRAWINGS

The invention may best be understood by reference to the following description taken in conjunction with the accompanying drawings, in which:

FIG. 7 is a side elevation of the tine assembly shown in FIG. 6.

FIG. 8 is a partial cross-sectional view of the injection tine assembly shown in FIG. 7.

FIG. 9 is a front plan view of the tine assembly shown in FIG. 6.

FIG. 10 is a cross-sectional view of the injection tine assembly shown in FIG. 9, including a diffuser.

FIG. 19A is a top view illustration showing rotational movement of an injection tine around the Z axis.

FIG. 19B is front view illustration showing rotational movement of the injection tine around the X axis.

FIG. 19C is a side view illustration showing rotational movement of the injection tine around the Y axis.

DETAILED DESCRIPTION OF ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 2:
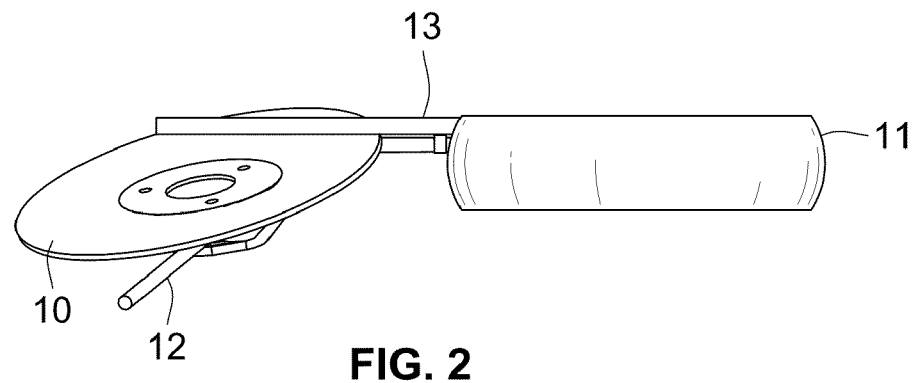
FIG. 2 is a top plan view of the devices shown in FIG. 1.
Figure 1:
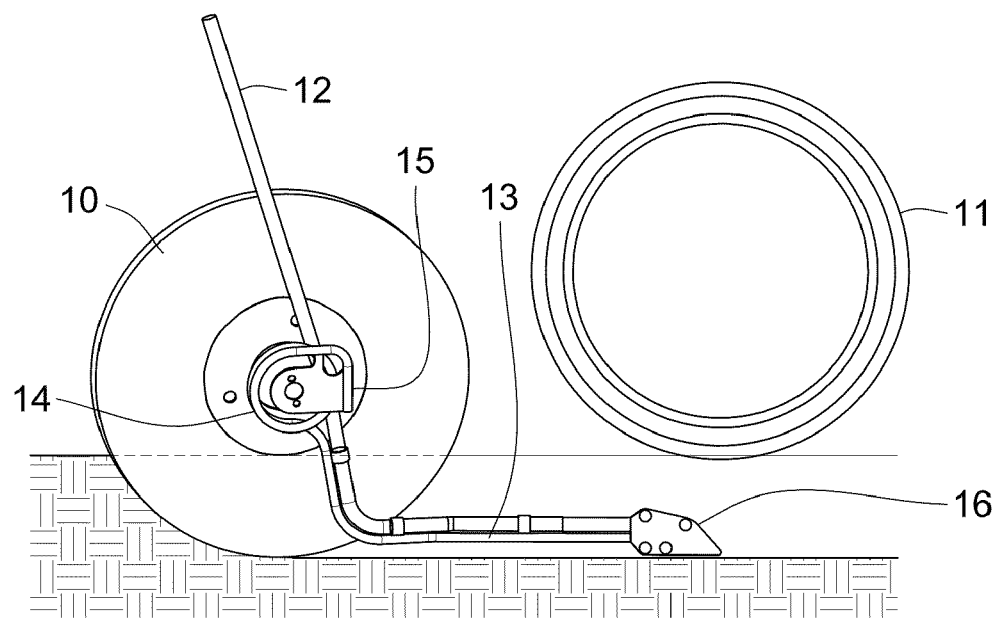
FIG. 1 is a side elevation of a portion of an agricultural tillage implement that includes an opener disc, an ammonia delivery tube and a closing wheel.
Figure 3:
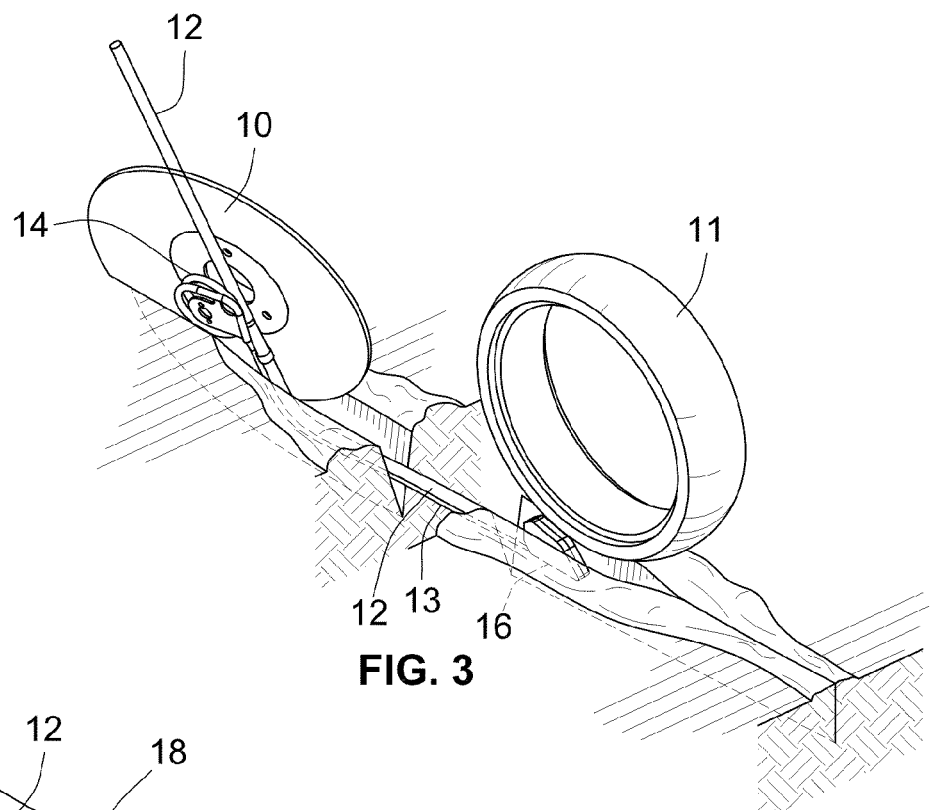
FIG. 3 is a perspective view of the devices shown in FIG. 1.

Turning now to the drawings and referring first to FIGS. 1-3, the illustrative agricultural tillage and fertilizing implement includes a cutting device such as an opener disc 10 for forming a furrow for receiving fertilizer, and a closing device such as a closing wheel 11 for closing the furrow after fertilizer has been delivered into the furrow. Those working in the agricultural field sometimes use the term "slot" instead of "furrow." Both the opener disc 10 and the closing wheel 11 are mounted on brackets depending from a conventional frame adapted to be towed by a tractor. A portion of a bracket 15 carrying the opener disc 10 is shown in FIG. 1.

The illustrative opener disc 10 is tilted slightly, as can be seen in FIGS. 1-3, but opener discs that are substantially vertical are also used for cutting furrows in soil. The opener disc 10 may be replaced with a conventional knife opener or "shank," and the closing wheel 11 may be replaced with any of a variety of different closing devices that are well known in the agricultural implement industry. Both fertilizer and seeds may be deposited in the furrow before it is closed, when the implement is used as part of a tilling operation, or just fertilizer when the implement is used only for fertilizing and/or cultivating.

Extending downwardly along one side of the opener disc 10 is an ammonia delivery tube 12 for delivering ammonia gas into the furrow formed by the disc 10. The portion of the delivery tube that extends into the furrow is guided and supported by a tine 13 that extends downwardly from the bracket 15 and then bends rearwardly toward the closing wheel 11, preferably overlapping a portion of the closing wheel so that the ammonia is discharged into the furrow just before, or even just after, the furrow is closed. That is, the delivery tube 12 extends rearwardly along the bottom of the furrow to the closing wheel 11 and delivers ammonia gas onto at least one wall of the furrow in the vicinity of where the furrow is closed by the closing wheel. The tine 13 is preferably spring biased toward the bottom of the furrow by a conventional spring 14 mounted on the bracket 15 in which the axle of the opener disc is journaled. Alternatively, the tine itself may be made resilient so that it can be positioned near the bottom of the furrow with the ability to flex upwardly as required by the soil conditions. Also, the tine and the delivery tube may be integrated in a single part. The tine, or the single integrated part, can be made of either metal or polymeric material.

Figure 4:
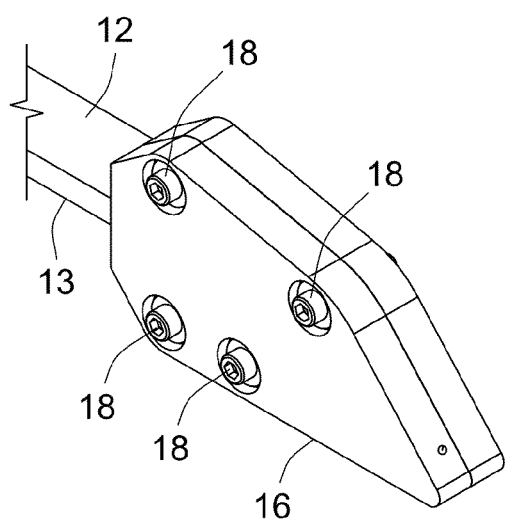
FIG. 4 is an enlarged perspective view of the diffuser tip on the trailing end of the ammonia delivery tube shown in FIGS. 1-3.
Figure 5:
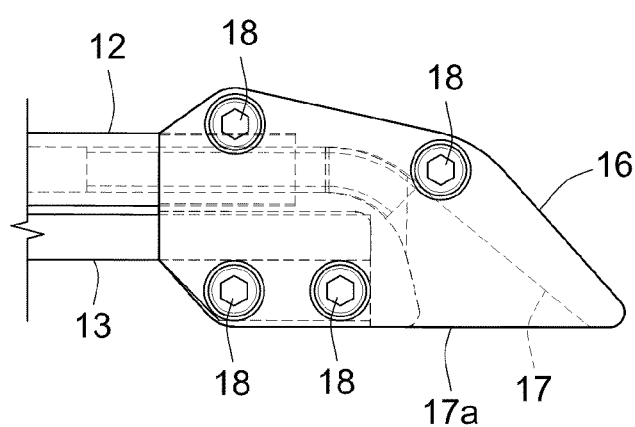
FIG. 5 is a side elevation of the diffuser tip shown in FIG. 4.

A discharge nozzle 16 (see FIGS. 4 and 5) is mounted on the trailing end of the ammonia delivery tube 12 for discharging ammonia gas onto at least the bottom of the furrow formed by the opener disc 10. As can be seen in FIG. 5, the discharge nozzle 16 forms an expansion chamber 17 to allow expansion of the ammonia gas just before the gas is discharged from the nozzle 16. This reduces the velocity at which the gas is discharged, thereby improving absorption of the ammonia in the soil by reducing the amount of ammonia that is deflected off the soil and out of the furrow. The exit opening 17a of the expansion chamber 17 is on the bottom of the nozzle 16 so that the gas is directed onto the bottom wall of the furrow formed by the opener disc 10. Because the tine 13 is biased downwardly, the nozzle 16 is maintained in engagement with the bottom of the furrow so that it is difficult for the pressurized ammonia gas to escape into the atmosphere rather than penetrating into the soil. The chamber 17 may also be provided with side holes to discharge ammonia gas onto the side walls of the furrow, as well as the bottom wall.

The exact shape and size of the chamber 17 is determined based on soil properties. For example, the volume of the chamber should be relatively lower when the moisture level of the soil is high than when the moisture level of the soil is low. Alternatively, the discharge nozzle 16 lacks the chamber 17 and functions solely as an insulator.

The ammonia gas delivery tube 12 and the discharge nozzle 16 may both be made of non-metallic material, such as a polymeric material, so that these components have low thermal conductivity. This is desirable because the expansion of the ammonia gas as it is released into the soil typically causes freezing in various conditions of temperature and humidity, and the freezing can have an adverse effect on performance. For example, moisture can become frozen in the gas discharge opening and reduce, or even interrupt, the delivery of ammonia into the soil. Soil and moisture can also freeze on the tine 13 and even on the soil-cutting device, especially when it is a non-rotating device such as a knife or shank. Forming the discharge nozzle and the delivery tube of polymeric material having low thermal conductivity thermally isolates the gas discharge area from the metallic portions of the implement, thereby preventing or at least reducing the freezing of soil and moisture on those metallic portions. For example, the ammonia gas delivery tube may be a polymeric hose, and the discharge nozzle 16 may be formed as a molded plastic clamshell attached to the trailing end of the tine 13 by multiple screws 18.

It will be understood that the ammonia is supplied to the delivery tube 12 from a pressurized tank carried by the implement. If desired, the ammonia from the tank can be fed to a pump that increases the pressure of the ammonia in the delivery tube so that a substantial portion of the ammonia is maintained in liquid form.

It can be seen that the discharge nozzle in the illustrative embodiment is positioned to release the ammonia gas directly below a portion of the closing wheel. This minimizes the tendency of the ammonia to escape as gas in the area between the point where the gas is released from the discharge nozzle and the point where the furrow is closed by the closing wheel 11.

The plastic discharge nozzle 16 is shaped to form a seal against the bottom and/or the sides of the furrow formed by the opener disk 10 (see FIG. 1). The expansion chamber 17 diffuses the ammonia gas so that the gas is exposed to a greater surface area of soil without being allowed to be exposed to the atmosphere, and to slow down the velocity of the fluid flow. Each unit of soil has a limited capacity to bind with ammonia, and thus increasing the area of soil that can bind with the ammonia, while limiting the ability of the ammonia to escape as gas to the atmosphere, generally improves the performance of the ammonia delivery device.

The implement described above may be used for tilling and fertilizing a field to be planted later, or in conjunction with a tillage implement that has a seed hopper and seed delivery device for depositing seed in the furrow between the cutting device and the closing device.

Figure 6:
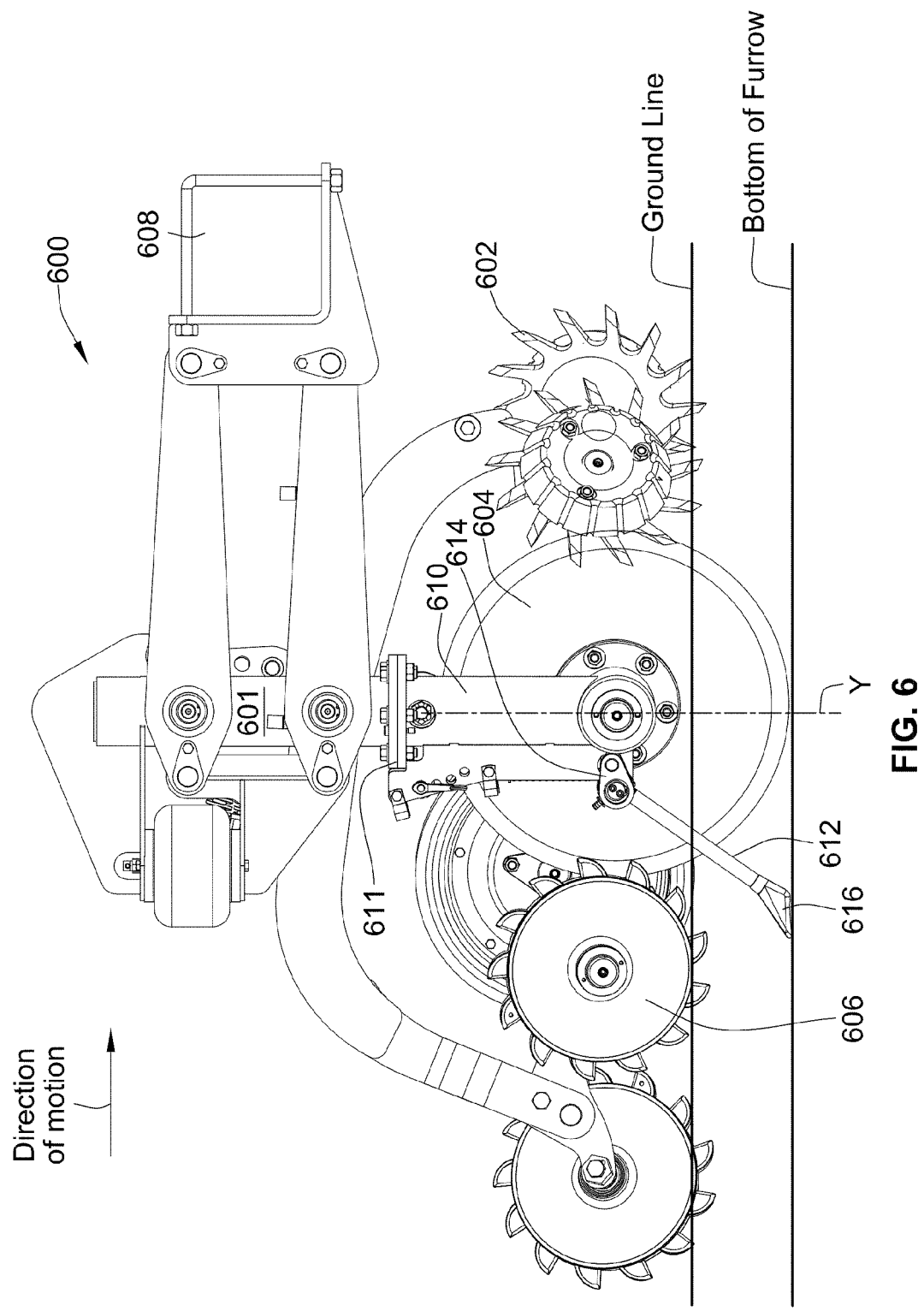
FIG. 6 is a side elevation of an agricultural tillage implement that includes an injection tine assembly.
Figure 11:
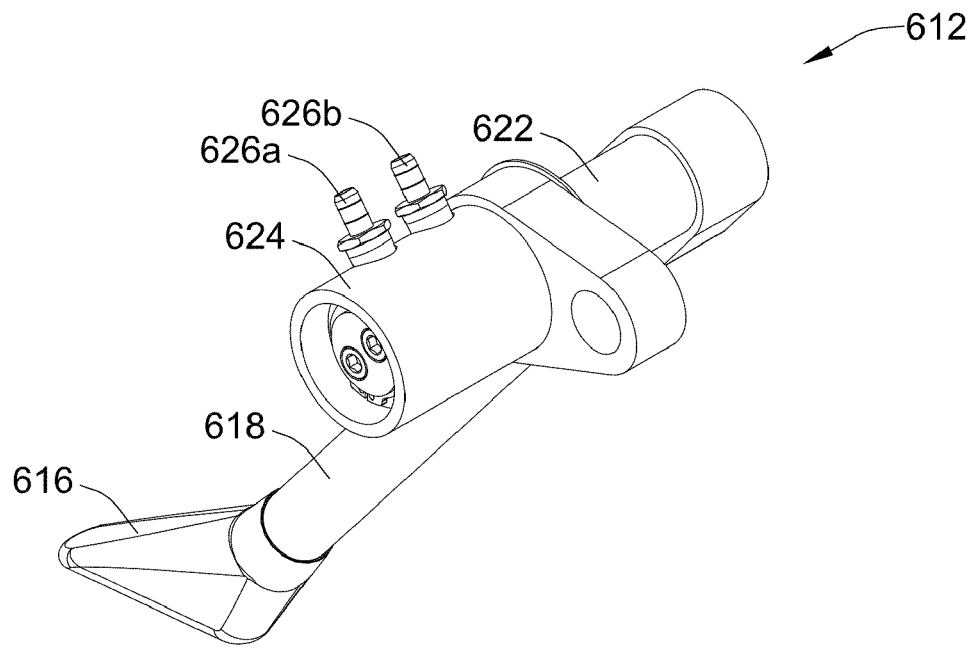
FIG. 11 is a perspective view of the injection tine assembly shown in FIG. 6.

Referring to FIG. 6, a fertilizing assembly 600 includes advantageous features directed to an angular adjustment for an opener disc and to a coaxial tine for an injection tine assembly. The fertilizing assembly 600 includes a main frame 601 to which a plurality of residue clearing wheels 602, an opener disc 604, and a plurality of closing wheels 606 are attached. The fertilizing assembly 600 is attachable to a towing vehicle, such as a tractor, via a frame attachment 608. The opener disc 604 is mounted to the main frame 601 via a depending arm 610, which is positioned in a generally vertical position and has an angular adjustment axis of rotation Y.

The depending arm 610 can be adjusted around the axis of rotation Y at an arm mount 611 such that the angle of the opener disc 604 can be changed. The angular change of the opener disc 604 causes a specific furrow width to be created. In other words, if the opener disc 604 is oriented generally parallel to the length of the furrow, the width of the furrow will be smaller, and if the opener disc 604 is oriented generally towards a perpendicular orientation relative to the length of the furrow, the width of the furrow will be larger.

The closing wheels 606 are mounted to the main frame 601 at a point above the arm mount 611 to provide a fixed position for the closing wheels 606 relative to the direction of motion of the tractor. Thus, adjustment of the depending arm 610 does not affect the position of the closing wheels 606.

The fertilizing assembly 600 further includes an injection tine assembly 612, which is coupled to the depending arm 610 at a pivoting end 614. Another end of the injection tine assembly 612 includes a diffuser (also referred to as a discharge nozzle) 616 that is generally biased toward the bottom of the furrow. The diffuser 616 is a general fluid discharge point that is placed in the furrow opened by the opener disc 604.

Referring to FIGS. 7-11, the injection tine assembly 612 includes a rod (or tine) 618 to which the diffuser 616 is connected at a bottom end, and to which a pivoting assembly 620 is connected at the pivoting end 614. The pivoting assembly 620 includes a pivoting shaft 622 and a fluid inlet housing 624, which includes a plurality of fluid inlet ports 626a, 626b.

As more clearly illustrated in FIG. 8, the rod 618 includes a plurality of coaxial tubes for forming passageways through which respective fluids flows toward the diffuser 616. Specifically, the coaxial tubes include an outer tube 628 and an inner tube 630. The outer tube 628 provide the primary structural support for the rod 618 and, typically, is formed from stainless steel material to provide good abrasion resistance to the soil and to resist highly corrosive agricultural products. A first fluid can flow through an outer passageway 632 that is formed between the outer tube 628 and the inner tube 630. A second fluid can flow, simultaneously with the first fluid, through an internal passageway 634 surrounded by the inner tube 630.

Referring to the pivoting assembly 620 and the fluid inlet housing 624 in more detail, the first fluid is inserted via a first tube 636 at a first insertion point 638, and the second fluid is inserted via a second tube 640 at a second insertion point 642. The first tube 636 and the second tube 640 of the pivoting assembly 620 are positioned parallel to each other in adjacent positions. A pair of plugs 644a, 644b prevent fluid flow in a direction away from the diffuser. A plurality of O-rings 646a, 646b, 646c are mounted to prevent fluid leaks near the fluid insertion points 638, 642. Delivering the fluids, which may generally include hazardous and caustic liquids, through the pivoting assembly 620 removes the need for having loose tubes near a dangerous blade area where crop residue tends to remain lodged. Accordingly, the pivoting assembly 620 provides a robust enclosure for chemical hose routings (e.g., the first tube 636 and the second tube 640) with increased safety and performance features.

For example purposes, it is assumed that the first fluid is water or an aqueous fertilizer solution and the second fluid is ammonia gas or ammonia liquid. According to the embodiment described above, water enters the pivoting assembly 620 at the first insertion point 638, flows through the first tube 636, and continues flowing through the outer passageway 632 of the rod 618 toward the diffuser 616. Similarly, ammonia gas enters the pivoting assembly 620 at the second insertion point 642, flows through the second tube 640, and continues flowing through the internal passageway 634 toward the diffuser 616. Before reaching a mixing chamber of the diffuser 616, the two fluids remain unmixed.

Referring more specifically to FIG. 10, the pivoting assembly 620 is biased in a downward position (toward the furrow) by a spring 650. The force of the spring helps maintain the diffuser 616 near the bottom of the furrow with the ability to flex upwardly as required by the soil conditions. For example, the pivoting assembly 620 allows the diffuser 616 to flex over rocks and obstructions. Optionally, in accordance with environmental conditions, the spring pressure is adjustable to provide a desired force.

Figure 12:
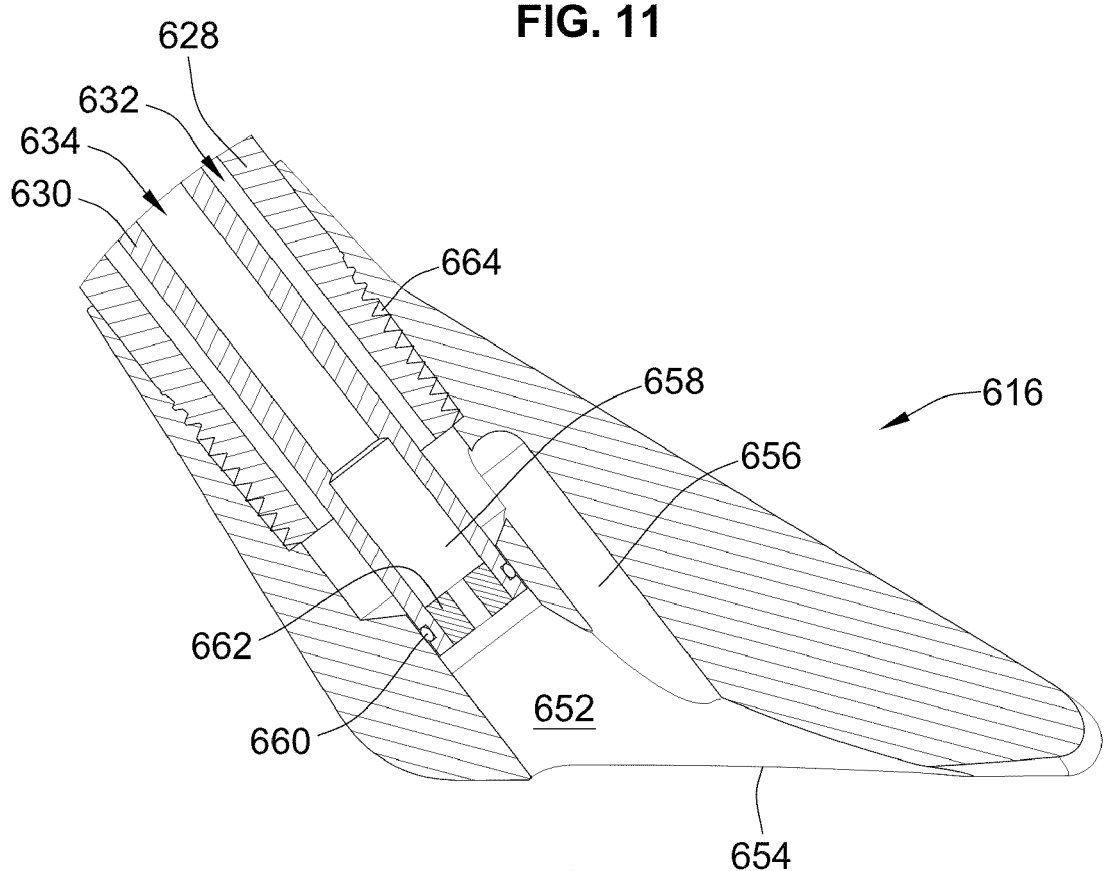
FIG. 12 is an enlarged cross-sectional view of the diffuser shown in FIG. 10.

Referring now to FIG. 12, the diffuser 616 has a generally rounded shape that prevents soil and/or plant residue from attaching to the rod 618 and, therefore, from interfering with the movement of the rod 618 through the furrow. The diffuser 616 includes a mixing chamber 652 and an exit opening 654. The first fluid enters the mixing chamber 652 via a first inlet opening 656 and the second fluid enters the mixing chamber 652 via a second inlet opening 658. A diffuser O-ring 660 seal prevents mixing of the two fluids before reaching the mixing chamber 652. Optionally, a removable plug 662 can be inserted in the second inlet opening 658 to temporarily prevent fluid flow from the internal passageway 634 into the mixing chamber 652.

When the fluids reach the mixing chamber 652, they mix to produce a chemical reaction. Because the mixing occurs in the expansion chamber 652, which is next to the bottom of the furrow, a more efficient chemical reaction is achieved, wherein none or minimal vapor loss occurs. For example, it is often advantageous to achieve mixing of anhydrous ammonia with a water-based liquid fertilizer product because the mixture alters the ammonia rapidly into a form that will not escape as a gas. The mixing chamber 652, which is only open toward the exterior environment on the bottom of the diffuser 616, at the exit opening 654, confines the chemical reaction to bias the byproduct of such a reaction toward the soil. Accordingly, the byproduct fertilizer is applied to the soil more efficiently by binding a higher quantity of fertilizer to the soil and minimizing loss to the air (wherein ammonia is lighter than air).

According to one embodiment, the diffuser 616 includes a plurality of threads 664 that are intended to engage mating threads on the rod 618 when connecting the diffuser 616 to the rod 618. The threads 665 of the diffuser 616 are optionally integratedly formed with the body of the diffuser 616. According to alternative embodiments, other fastening devices (such as adhesives) can be used to connect the diffuser 616 and the rod 618.

The diffuser 616 may be formed as a molded plastic casing using a compression molding process. The plastic material can be, for example, a UHMW (Ultra High Molecular Weight Polyethylene) material that is well suited for forming complex surface geometries. Another advantages of the UHMW material is that it provides high wear resistance. Alternatively, the diffuser 616 is formed (e.g., machined, cast, forged) from a metal material.

In addition to manufacturing advantages, the UHMW material is further desirable because it insulates the fluids from thermal transfer. For example, the diffuser 616 functions as an insulator and, also, maintains separation between the outer tube 628 and the inner tube 630. For example, if ammonia gas is supplied in the internal passageway 634, the diffuser 616 inhibits freezing of the discharge point of the ammonia gas in the mixing chamber 652. Additionally, the freezing of the ammonia gas (or any other internal fluid) along the rod 618 is further inhibited by the fluid being supplied in the outer passageway 632 (e.g., water), which functions as an additional layer of insulation. Based at least on these two insulating features of the injection tine assembly 612, current needs for typical "heat exchanger" expansion chambers (which are required for cooling and maintaining ammonia gas in a liquid state so that it can be metered accurately) is minimized.

Figure 13:
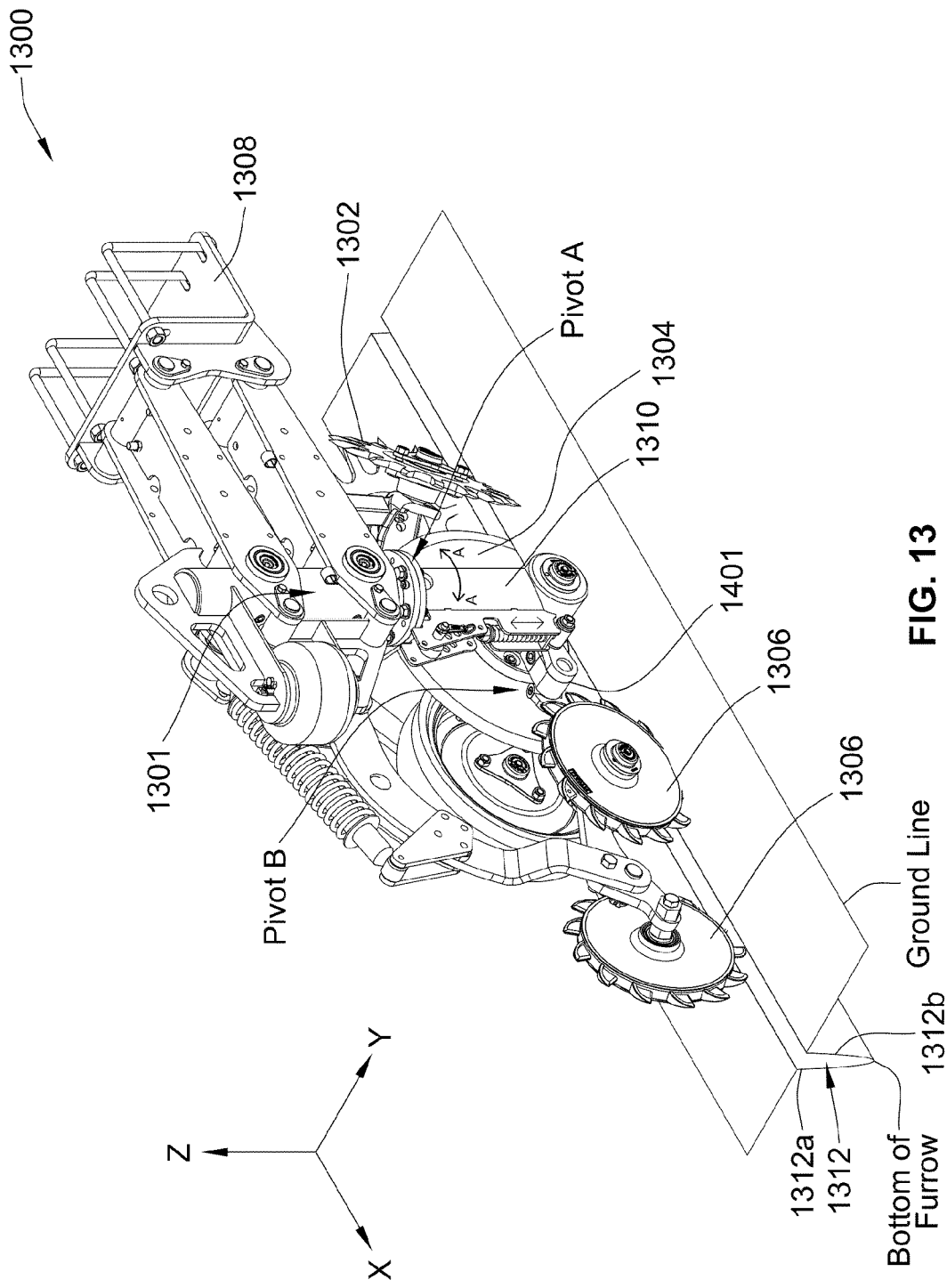
FIG. 13 is a perspective of an agricultural tillage implement, according to an alternative embodiment.

Referring to FIG. 13, an agricultural implement 1300, such as a fertilizer assembly, includes a main frame 1301 to which a plurality of residue clearing wheels 1302, an opener disc 1304, and a plurality of closing wheels 1306 are attached. The agricultural implement 1300 is attachable to a towing vehicle, such as a tractor, via a frame attachment 1308. In another example, the agricultural implement 1300 can be a multi-use single disc injection coulter, in which the ground engaging structure is mounted on a parallel linkage.

The opener disc 1304 is mounted to the main frame 1301 via a depending arm 1310, which is positioned in a generally vertical position and is attached to the main frame 1301 at Pivot A. Pivot A is a pivotable connection between the depending arm 1310 and the main frame 1301 that allows angular changes to the opener disc 1304 in a pivoting direction A around a vertical (Z) axis. Auxiliary components, such as the residue clearing wheels 1302, are mounted directly to the main frame 1301, independently of the depending arm 1310.

The angular changes of the opener disc 1304 in the pivoting direction A do not affect other auxiliary components. For example, the angular change of the opener disc 1304 does not cause an angular change to the residue clearing wheels 1302 (or other such auxiliary components). This is important because auxiliary components are interacting with the furrow being created and are not making the furrow themselves. The auxiliary components need to continue to act along the direction of motion. The angular change of the opener disc 1304 is further described below in reference to FIG. 19.

The opener disc 1304 is adapted to form a furrow 1312 having a generally V-shaped profile defined by two inclined sidewalls 1312a, 1312b. The V-shaped profile, as shown, is a theoretical cross-section of the furrow 1312. As shown, for reference purposes, a first horizontal (X) axis is generally along the length of the furrow 1312 and a second horizontal (Y) axis is generally perpendicular to the length of the furrow 1312. The forming of the furrow 1312 is also known as opening or cutting a slot in the ground.

In addition to the pivotable connection of Pivot A, the agricultural implement 1300 further includes another pivotable connection at a Pivot B. Pivot B is a pivotable connection between a tine 1400 (shown in FIG. 14) and a pivoting assembly 1401. As explained in more detail below, Pivot B allows free movement of the tine 1400 while the tine 1400 is moving in the furrow 1312.

Figure 14:
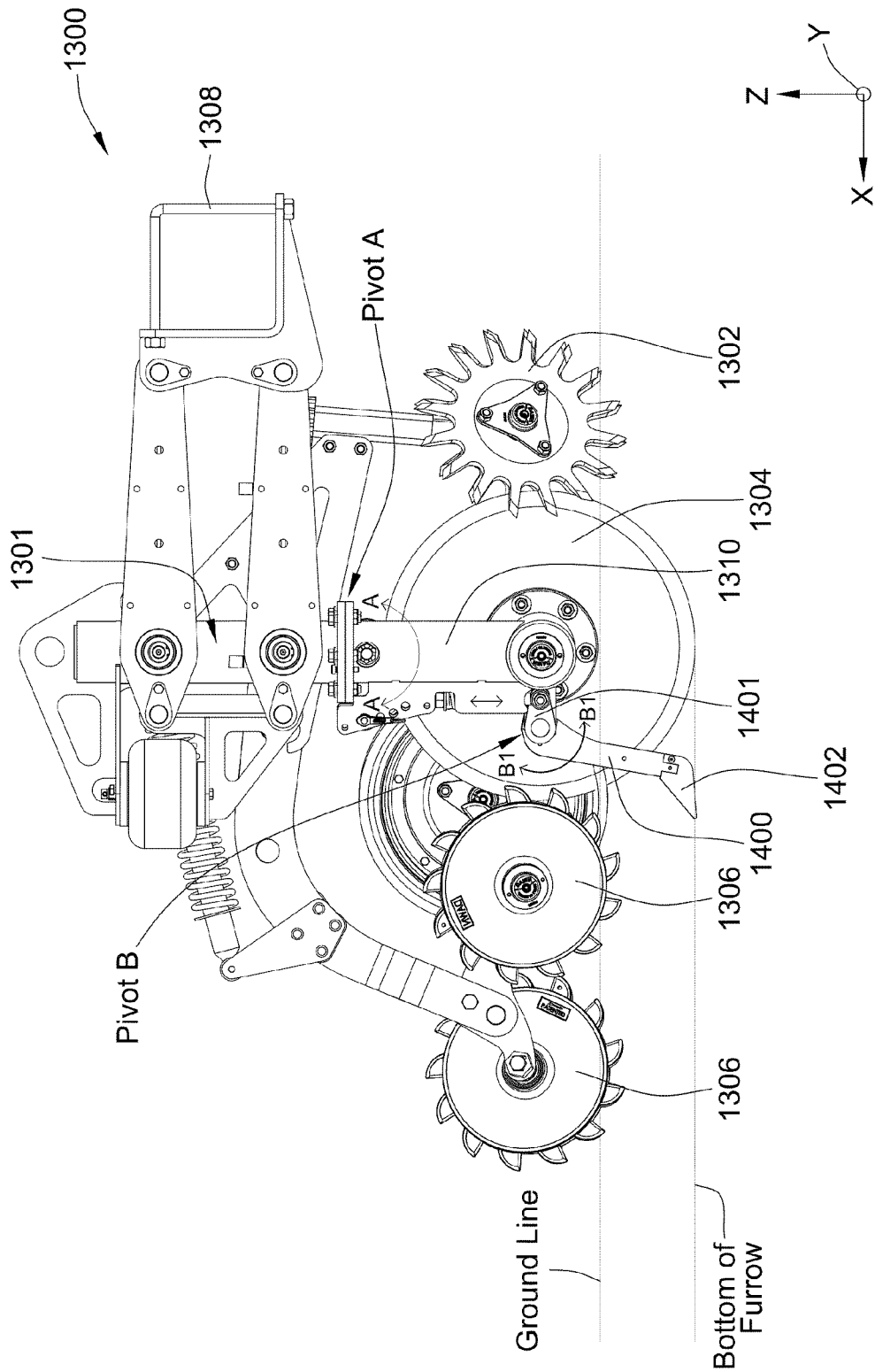
FIG. 14 is a side view of the agricultural tillage implement of FIG. 13.
Figure 15:
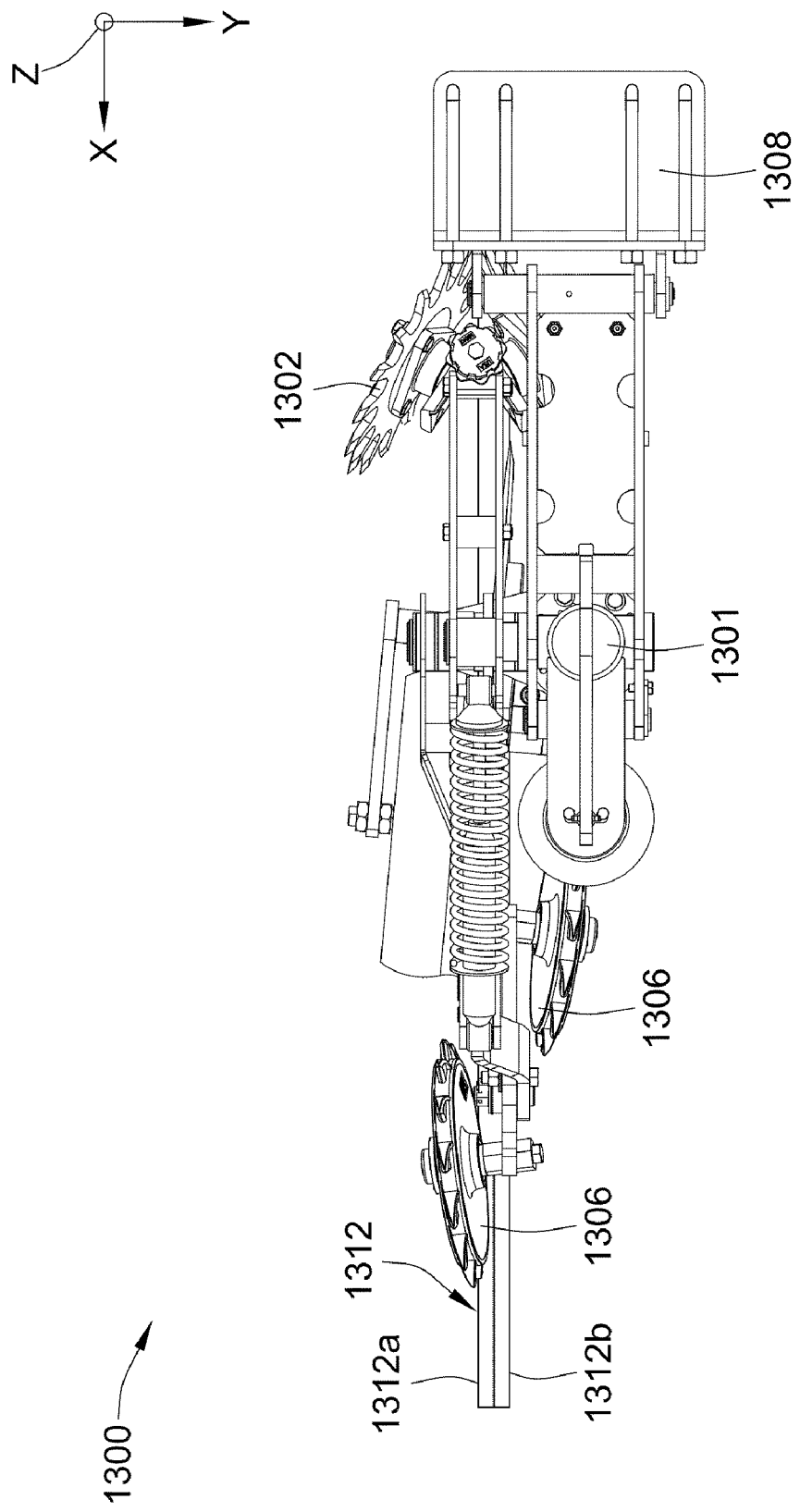
FIG. 15 is a top view of the agricultural tillage implement of FIG. 13.
Figure 16:
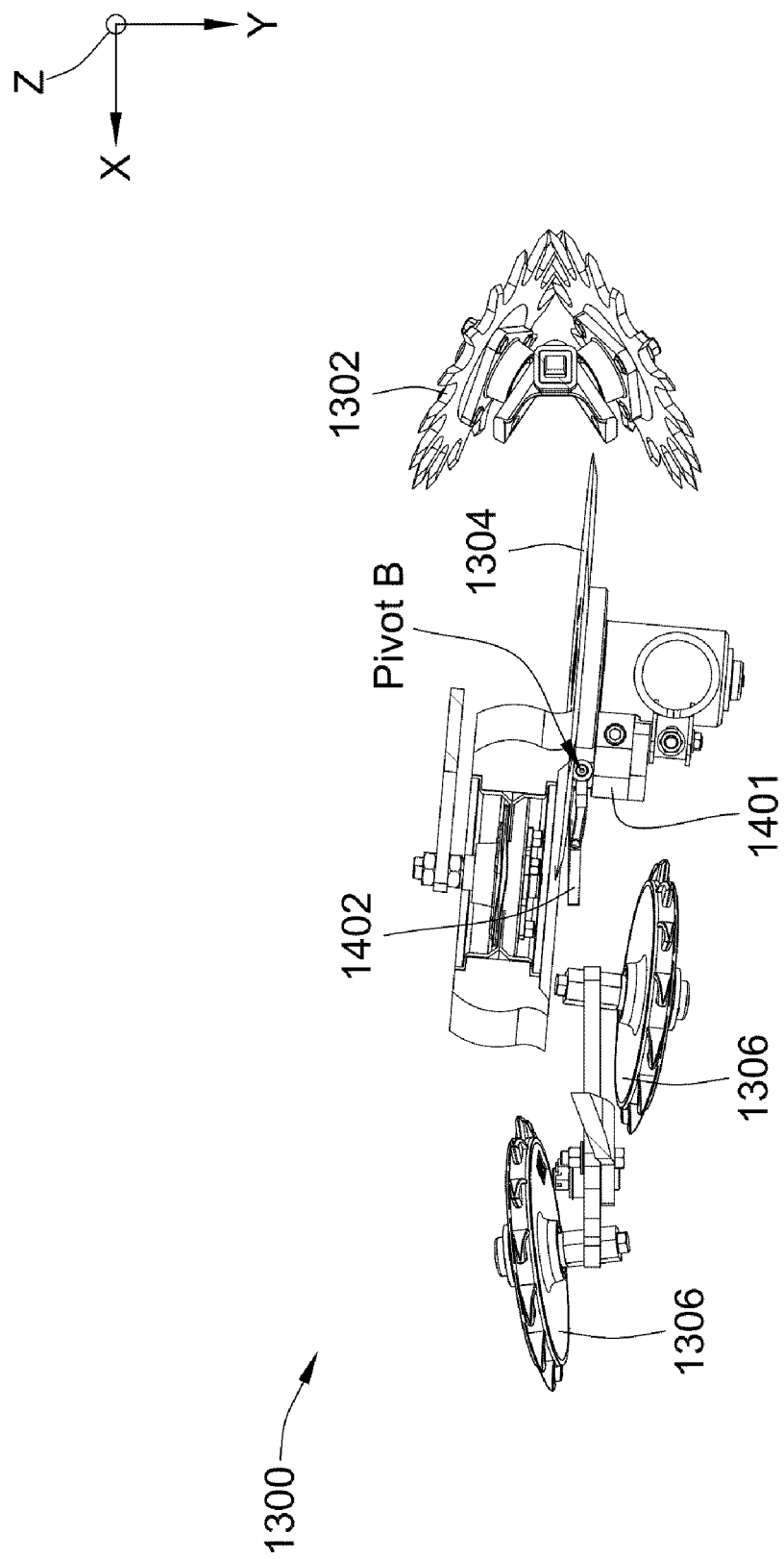
FIG. 16 is a cross-sectional top view showing some of the components of the agricultural tillage implement of FIG. 13.

Referring to FIGS. 14-16, the tine 1400 is generally a floating rudder-type injection tine that has various features, including features similar to the tine 618 described above in reference to FIGS. 7-11. For example, the tine 1400 is connected to a diffuser 1402 at a bottom end and to the pivoting assembly 1401 at a pivoting end.

Figure 17:
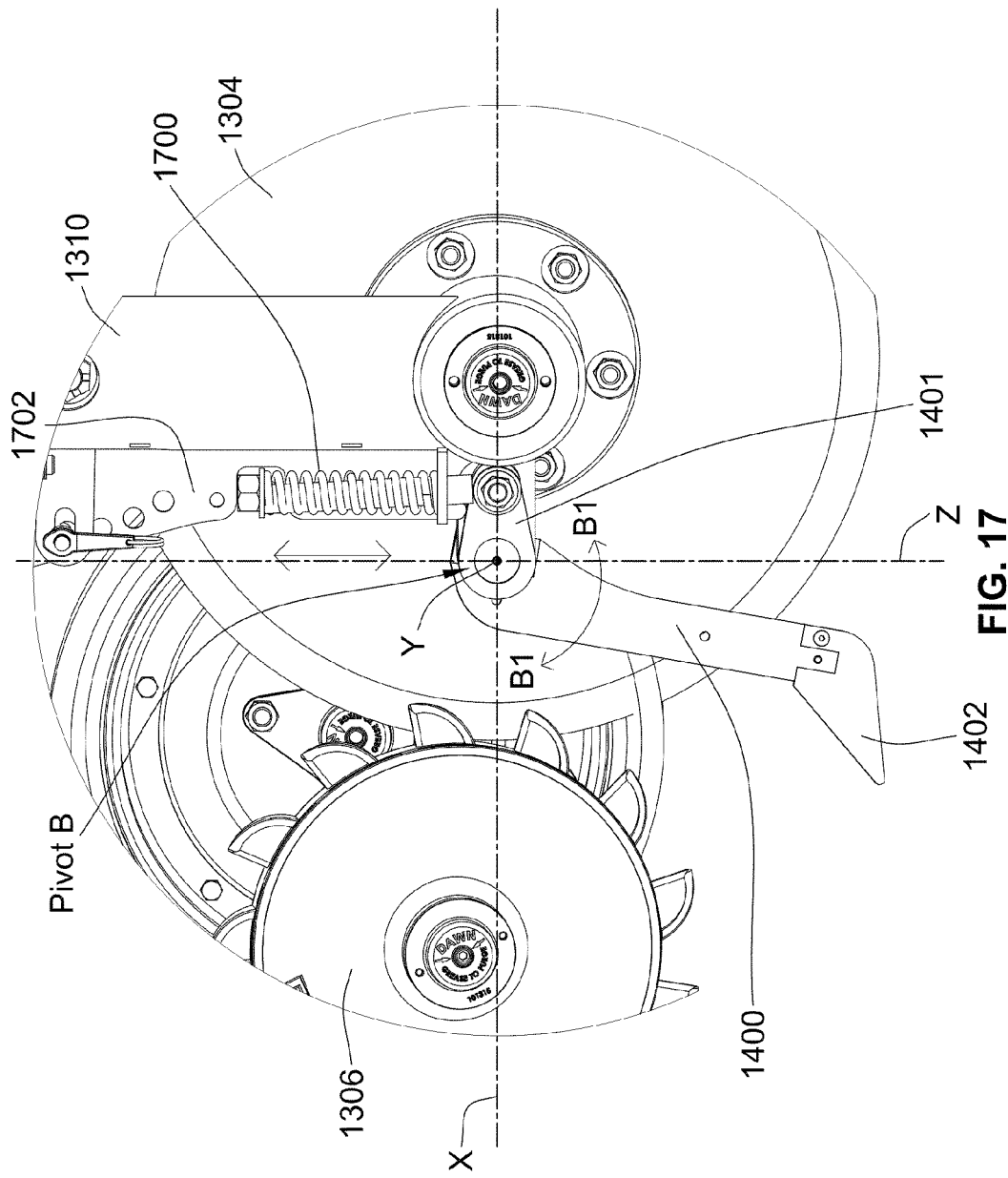
FIG. 17 is an enlarged view showing a variation of a tine assembly of the agricultural tillage implement of FIG. 13.

Referring generally to FIGS. 17-20, the tine 1400 is freely movable in three independent pivotable directions B1, B2, and B3. Referring more specifically to FIG. 17, a first pivotable movement B1 is around the Y axis and allows the tine 1400 to flex over obstructions, such as rocks, when the tine 1400 is in motion. Thus, this pivoting movement is advantageous at least because it eliminates, or greatly reduces, the likelihood of damage that the obstructions may cause to the tine 1400 or other related components. The first pivotable movement B1 is also shown in FIG. 19C.

To achieve the first pivotable movement B1, the tine 1400 is biased via a spring 1700. The spring 1700 exerts a linear force that can be exerted, depending on the orientation of the spring 1700, either in a downward direction along the Z axis (toward the furrow 1312), as shown in FIG. 17, or in a generally horizontal direction along the X axis, as shown in FIG. 19C. The spring 1700 is attached to a mounting bracket 1702, which is connected to the depending arm 1310, such that a lower end of the spring 1700 forces the tine 1400 downward in a flexible manner. The force of the spring 1700 helps maintain the diffuser 1402 near the bottom of the furrow 1312, and provides the tine 1400 with the ability to flex upwardly as required by the soil conditions. As such, the spring 1700 allows the diffuser 1402 to temporarily flex upwardly over rocks and other obstructions. Optionally, in accordance with environmental conditions, the spring pressure is adjustable to provide a specific desired force.

Figure 18:
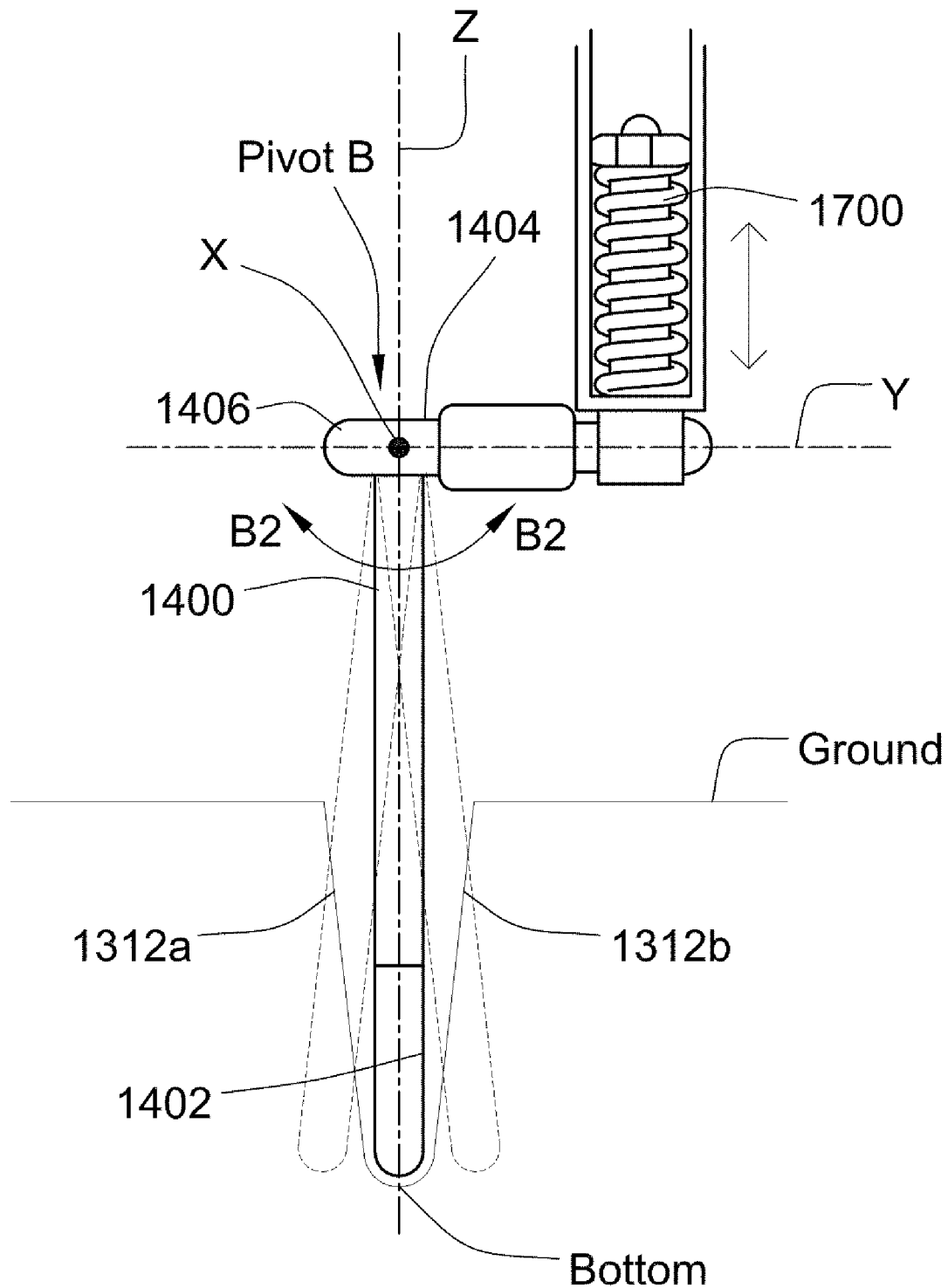
FIG. 18 is rear view illustration showing rotational movement of an injection tine around the X axis.

Referring more specifically to FIG. 18, the tine 1400 is further freely movable in a second pivotable direction B2 around the X axis. The tine 1400 has a pivoting end 1404 that is attached to a shaft 1406, which is generally horizontal and extends between a lower end of the spring 1700 and the centerline of the furrow 1312. Thus, in this embodiment, the tine 1400 is offset from the spring 1700. The second pivotable direction B2 is also shown in FIG. 19B.

Referring more specifically to FIG. 19A, the tine 1400 is further freely movable in a third direction B3 around the Z axis. The free movement of the tine 1400 in the third pivotable direction B3 allows the tine 1400 to stay centered on the furrow 1312, between the two furrow sidewalls 1312a, 1312b, as the angle of the opener disc 1304 is changed and, also, it prevents the tine 1400 from riding out of the furrow 1312 if the agricultural implement 1300 is driven around a curve. If the tine 1400 is not running in the furrow 1312, but interferes with one of the sidewalls 1312a, 1312b, the tine 1400 will tend to ride out of the ground, build with mud, grab plant residue, and fail to properly seal ammonia or other chemicals applied via the tine 1400.

As noted above, the free movement of the tine 1400 in all three pivoting directions B1-B3 allows the diffuser 1402 to self-locate the desired maximum depth of the furrow 1312. Thus, the tine 1400 is connected at Pivot B such that it can advantageously pivot (or rotate) freely in an independent manner in three directions: a first pivoting direction B1 around the Y axis, a second pivoting direction B2 around the X axis, and a third pivoting direction B3 around the Z axis.

Figure 20:
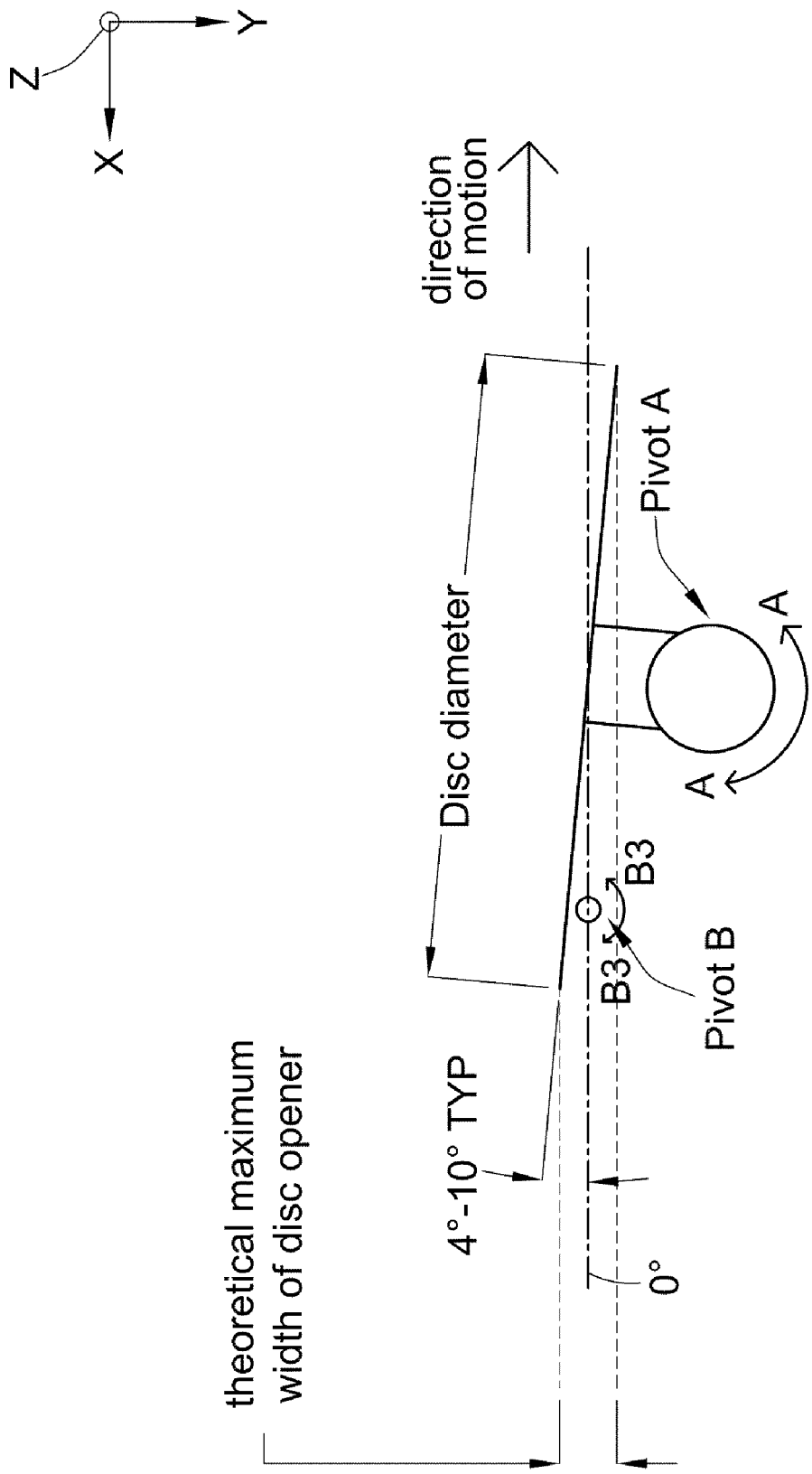
FIG. 20 is an illustration representing rotational movements of the injection tine and of an adjustable opener disc.

Referring more specifically to FIG. 20, a typical operation would generally require an angular adjustment of about 4°-10° between the centerline of the furrow and the maximum change in angle of the opener disc. Specifically, the angle of the opener disc is changeable from an initial setting of about 0°, which is generally along the length of the furrow, to a second setting that can range from about 4° to about 10°.

The pivotable free movement of the rudder type injection tine at the Pivot B allows the tine to float independently about three different axes and, accordingly, to track inside the furrow. The angular change of the opener disc about the vertical axis at Pivot A helps achieve furrows of different width. As the agricultural implement 1300 is being pulled in one direction, the opener disc forms a furrow with a desired width.

The ability to change the angle of the opener disc helps achieve different size fertilizer openings and different levels of soil and residue disturbance. Different product applications require a different size furrow be cut in the ground. For example, for manure, where a large volume of product is applied, a large furrow is necessary. In another example, anhydrous ammonia, where there is risk of product escaping to environment as gas, it is generally desired to have a small furrow opening.

Power consumption and soil disturbance/tillage are also affected by blade angle. As such, making easy adjustment of the angle between the plane of the opener disc and the direction of motion allows the opener disc to be used flexibly for multiple purposes.

It will be evident to those skilled in the art that the invention is not limited to the details of the foregoing illustrated embodiment and that the present invention may be embodied in other specific forms without departing from the spirit or essential attributes thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. An agricultural implement for delivering a fluid to the soil of an agricultural field, the agricultural implement comprising:
   a main frame;
   an opener device attached to the frame for forming a furrow in the soil;
   a closing device attached to the main frame and trailing the opener device for closing the furrow;
   a pivoting assembly attached to the main frame;
   an injection tine for delivering a fluid towards the furrow, the injection tine having a pivoting end attached to the pivoting assembly and a bottom end extending downwardly into the furrow between the opener device and the closing device, the pivoting end being pivotably connected at the pivoting end such that the injection tine is freely pivotable in at least two independent pivotable directions relative to the furrow; and
   a diffuser attached to the bottom end of the injection tine for expelling the fluid into the furrow.

2. The agricultural implement of claim 1, wherein one of the at least two independent pivotable directions is a first pivotable direction around a horizontal (Y) axis that is generally perpendicular to the length of the furrow, the first pivotable direction allowing the injection tine to self-adjust generally as the injection tine moves over obstructions.

3. The agricultural implement of claim 1, wherein one of the at least two independent pivotable directions is a second pivotable direction around a horizontal (X) axis that is generally parallel to the length of the furrow, the second pivotable direction allowing the injection tine to self-adjust generally along a centerline of the furrow.

4. The agricultural implement of claim 1, wherein one of the at least two independent pivotable directions is a third pivotable direction around a vertical (Z) axis that is generally perpendicular to the length of the furrow, the third pivotable direction allowing the injection tine to stay in the furrow when the agricultural implement is driven around a curve.

5. The agricultural implement of claim 1, wherein the injection tine is freely pivotable in three pivotable directions, a first pivotable direction around a horizontal (Y) axis that is generally perpendicular to the length of the furrow, a second pivotable direction around a horizontal (X) axis that is generally parallel to the length of the furrow, and a third pivotable direction around a vertical (Z) axis that is generally perpendicular to the length of the furrow.

6. The agricultural implement of claim 1, further comprising a spring coupled between the main frame and the pivoting assembly, the injection tine being biased in a flexible position by the spring to maintain the diffuser in contact with the bottom of the furrow, the spring causing a linear force for achieving one of the at least two independent pivotable directions.

7. The agricultural implement of claim 1, further comprising a depending arm attached to the main frame at a pivotable connection, the pivoting assembly being attached to the main frame via the depending arm, the closing device being attached to the main frame independently of the depending arm.

8. The agricultural implement of claim 1, further comprising a spring coupled between the main frame and the pivoting assembly, the pivoting assembly including a generally horizontal shaft that extends between the pivoting end of the injection tine and a lower end of the spring.

9. The agricultural implement of claim 1, the opener device is an opener disc pivotably attached to the main frame at a pivotable connection for allowing changes to the angle of the opener disc so that the opener disc can engage the soil at different angles.

10. The agricultural implement of claim 9, further comprising a depending arm attached to the main frame at the pivotable connection, the opener device being attached to the main frame via the depending arm.

11. The agricultural implement of claim 9, wherein the angle of the opener disc is changeable from an initial setting of about 0° to a second setting that can range from about 4° to about 10°, the 0° angle of the initial setting being at a centerline along the length of the furrow.

12. A method of delivering a fluid to the soil of an agricultural field, the method comprising:
   forming a furrow in the soil with a towed opener device;
   closing the furrow with a towed closing device trailing the opener device;
   extending an injection tine downwardly into the furrow between the opener device and the closing device, the injection tine having an upper end pivotably connected to a pivoting assembly and a bottom end coupled to a diffuser;
   while the injection tine is moving within the furrow, freely moving the injection tine at the upper end in three independent pivotable directions for self-adjusting between opposite walls of the furrow; and
   expelling the fluid through the diffuser after the closing of the furrow.

13. The method of claim 12, wherein the injection tine is freely movable in a first pivotable direction as the injection tine moves over obstructions, the first pivotable direction being around a horizontal (Y) axis that is generally perpendicular to the length of the furrow.

14. The method of claim 12, wherein the injection tine is freely movable along a centerline of the furrow in a second pivotable direction, the second pivotable direction being around a horizontal (X) axis that is generally parallel to the length of the furrow.

15. The method of claim 12, wherein the injection tine is freely movable in a third pivotable direction for allowing the injection tine to stay within the furrow when driven around a curve, the third pivotable direction being around a vertical (Z) axis that is generally perpendicular to the length of the furrow.

16. The method of claim 12, further comprising exerting a linear spring force on the injection tine to maintain the diffuser in contact with the bottom of the furrow, the linear spring force causing one of the three independent pivotable directions.

17. The method of claim 16, further comprising exerting the linear spring force in a downward position along a vertical (Z) axis that is generally perpendicular to the length of the furrow.

18. The method of claim 16, further comprising exerting the linear spring force in a general horizontal direction along a horizontal (X) axis that is generally parallel to the length of the furrow.

19. The method of claim 12, further comprising attaching the closing device and the opener device to a main frame in an independent manner, wherein the opener device is rotatable independently of the closing device.

20. The method of claim 12, further comprising adjusting an angle of the opener device with respect to the furrow so that the opener device engages the soil at different angles.

* * * * *